US012610402B2

(12) United States Patent (10) Patent No.: US 12,610,402 B2
Draznin et al. (45) Date of Patent: Apr. 21, 2026

(54) ENTERPRISE MOBILE NETWORK DELIVERY SYSTEM

(71) Applicant: Microsoft Technology Licensing, LLC, Redmond, WA (US)

(72) Inventors: Sagiv Draznin, Walnut Creek, CA (US); Ashwin Moranganti, South Grafton, MA (US); Arun Bhamidimarri, North Brunswick, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 719 days.

(21) Appl. No.: 17/890,026

(22) Filed: Aug. 17, 2022

(65) Prior Publication Data
US 2024/0064824 A1 Feb. 22, 2024

(51) Int. Cl.
*H04W 76/10* (2018.01)
*H04W 16/14* (2009.01)
(Continued)

(52) U.S. Cl.
CPC ........... *H04W 76/10* (2018.02); *H04W 16/14* (2013.01); *H04W 48/18* (2013.01); *H04W 60/00* (2013.01)

(58) Field of Classification Search
CPC .. G06Q 30/0621; H04W 76/10; H04W 16/14; H04W 48/18; H04W 60/00; H04W 24/02; H04W 84/045; H04W 16/16
See application file for complete search history.

(56) References Cited

U.S. PATENT DOCUMENTS

2020/0196203 A1* 6/2020 Yang ..................... H04W 36/10

FOREIGN PATENT DOCUMENTS

| EP | 2182753 A1 | 5/2010 |
| WO | 2023278179 A1 | 1/2023 |
| WO | 2023080604 A1 | 5/2023 |

OTHER PUBLICATIONS

Pal, Subhankar, "OSM for 5G O-RAN", In Proceedings of the European Telecommunications Standards Institute (ETSI), Jun. 9, 2021, 20 Pages.
(Continued)

*Primary Examiner* — Diane D Mizrahi
(74) *Attorney, Agent, or Firm* — ArentFox Schiff, LLP

(57) ABSTRACT
A service provider implements an enterprise mobile network delivery system providing enterprise customers with facilities to connect enterprise-provided white box radio unit hardware to public cloud-based network infrastructure to implement private wireless connectivity across a range of service types. The public infrastructure is provided by the service provider to support a universal enterprise mobile network operating over cellular frequencies including Citizens Broadband Radio Service (CBRS) in the 3.5 GHz range. The enterprise mobile network delivery system includes a portal having a user interface that enables enterprise customers to manage their individual private cellular networks and a radio registration entity that interfaces with the enterprise-provided hardware. The radio registration entity points the radios to appropriate functions in the universal enterprise mobile network and collects information from the radios to enable connectivity between the enterprise-provided radios and a core network of the universal enterprise mobile network.

9 Claims, 25 Drawing Sheets

(51) Int. Cl.
  *H04W 48/18*        (2009.01)
  *H04W 60/00*        (2009.01)

(56)            References Cited

OTHER PUBLICATIONS

"Invitation to Pay Additional Fee Issued in PCT Application No. PCT/US23/027196", Mailed Date: Oct. 2, 2023, 12 Pages.

* cited by examiner

| | # of radios | Service type | Supported users | Roaming to public MNO? |
|---|---|---|---|---|
| Enterprise A | 50 | Data | 100 | Yes |
| Enterprise B | 200 | IoT | 1000 | No |
| Enterprise C | 10 | Data and voice | 200 | Yes |

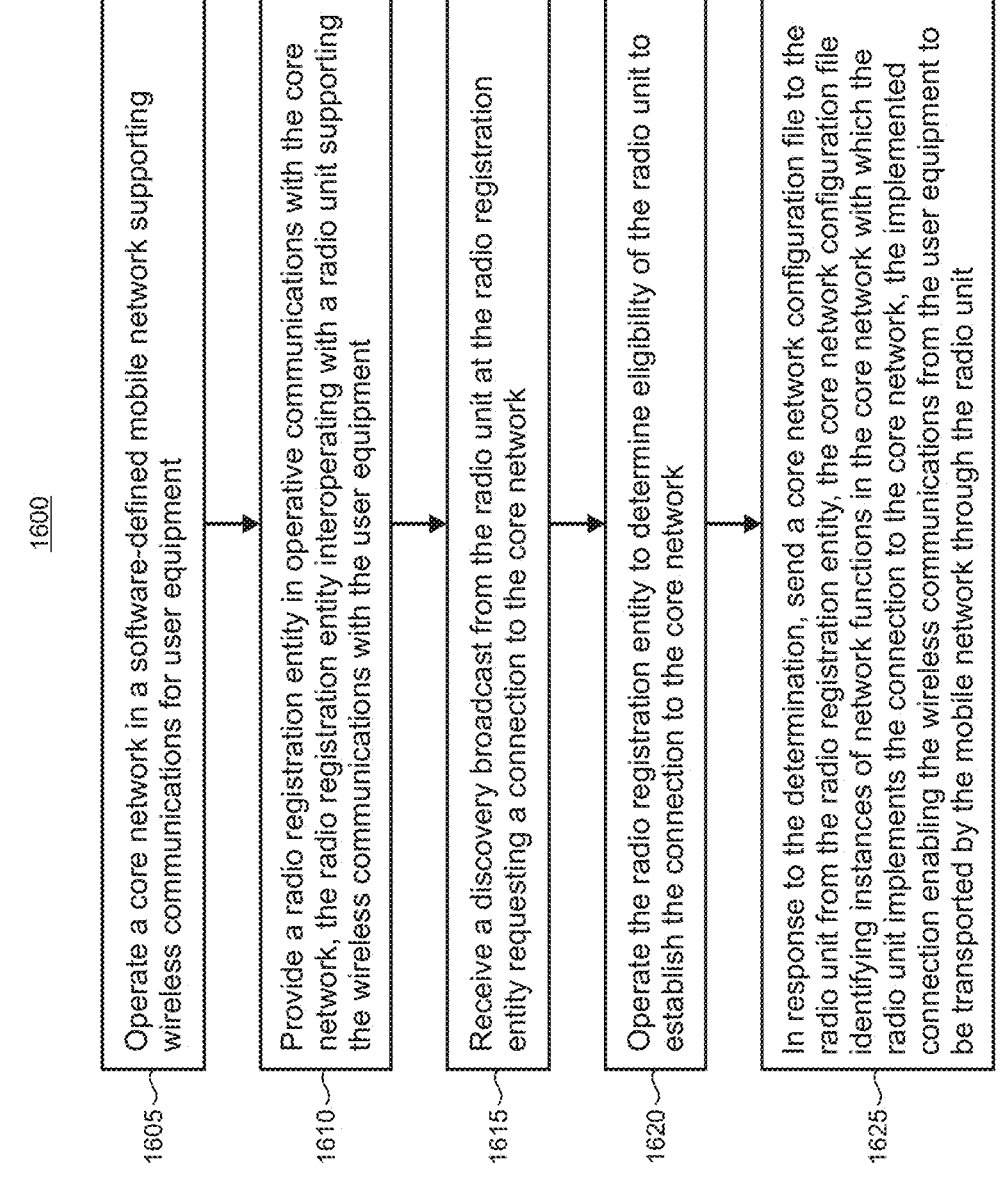

1600

1605 — Operate a core network in a software-defined mobile network supporting wireless communications for user equipment 1610 — Provide a radio registration entity in operative communications with the core network, the radio registration entity interoperating with a radio unit supporting the wireless communications with the user equipment 1615 — Receive a discovery broadcast from the radio unit at the radio registration entity requesting a connection to the core network 1620 — Operate the radio registration entity to determine eligibility of the radio unit to establish the connection to the core network 1625 — In response to the determination, send a core network configuration file to the radio unit from the radio registration entity, the core network configuration file identifying instances of network functions in the core network with which the radio unit implements the connection to the core network, the implemented connection enabling the wireless communications from the user equipment to be transported by the mobile network through the radio unit

1705 — Provide a business support system for managing billing for an enterprise mobile network, the enterprise mobile network comprising a radio access network and a core network 1710 — Provide a business support system for managing billing for an enterprise mobile network, the enterprise mobile network comprising a radio access network and a core network 1715 — Provide a configuration server in operative communications with the business support system, the configuration server providing information to enable authorized radio units to connect to the core network of the enterprise mobile network, wherein the business support system initiates a billing event responsively to an authorized radio unit being connected to the core network

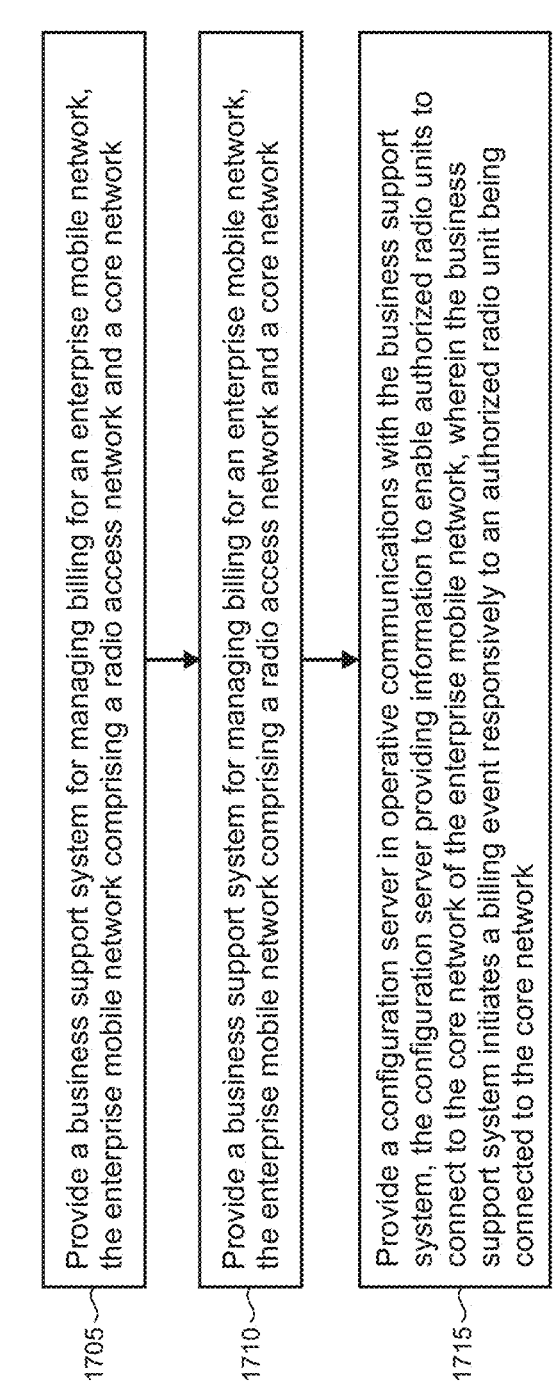

*FIG 18*

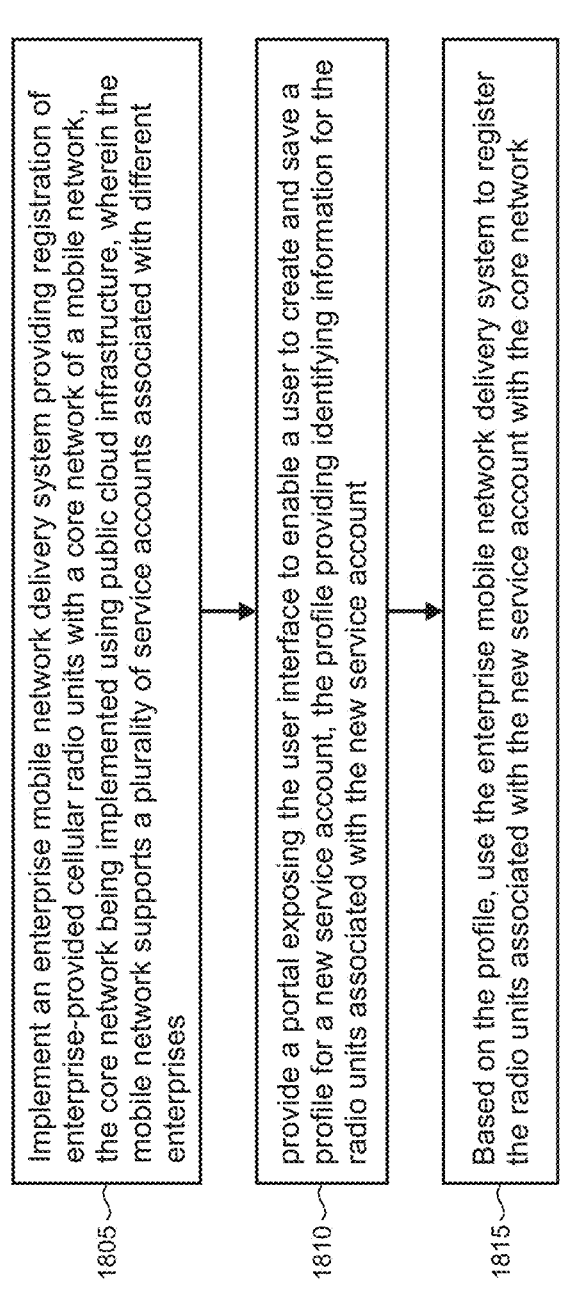

1800

1805 — Implement an enterprise mobile network delivery system providing registration of enterprise-provided cellular radio units with a core network of a mobile network, the core network being implemented using public cloud infrastructure, wherein the mobile network supports a plurality of service accounts associated with different enterprises 1810 — provide a portal exposing the user interface to enable a user to create and save a profile for a new service account, the profile providing identifying information for the radio units associated with the new service account 1815 — Based on the profile, use the enterprise mobile network delivery system to register the radio units associated with the new service account with the core network

1900

2000

2100

= UE-specific components

UE or white box RU

2210

2215 RF transceiver 2204
2250 Input
Display 2255

2230 RX processing circuitry

2240 TX processing circuitry

2220

2260
Processor

Memory 2265
Operating system
Applications 2010

2235 Speaker

Microphone 2225

2245 I/O interface

2202

2300

2400

ENTERPRISE MOBILE NETWORK DELIVERY SYSTEM

BACKGROUND

Wireless connectivity solutions in enterprise environments typically utilize wireless local area networks (WLANs) such as WI-FI® because of ease of deployment and scalability. However, WI-FI is not always an ideal choice for many enterprise environments as consistent, secure, and reliable coverage over large areas can be difficult to implement meeting target performance metrics such as low latency and high bandwidth. For example, indoor environments such as warehouses and factory floors and large outdoor spaces are often challenging for WI-FI solutions. The presence of interference from neighboring WI-FI networks across large venues such as retail locations and hospitals provides additional motivation to utilize private 4G LTE (fourth-generation Long Term Evolution) and 5G (fifth-generation) mobile cellular networks for voice and data and critical IoT (Internet-of-Things) infrastructure applications.

SUMMARY

A service provider implements an enterprise mobile network delivery system providing customers associated with enterprises, including organizations and businesses, with facilities to connect enterprise-provided white box radio unit hardware to public cloud-based network infrastructure to implement private wireless connectivity solutions across a range of service types including voice, data, and IoT. The public infrastructure is provided by the service provider to support a universal enterprise mobile network operating over cellular frequencies that include, for example, the 3.5 GHz range (known as Citizens Broadband Radio Service (CBRS) in the United States). In an illustrative embodiment, the universal enterprise mobile network uses software-defined networking (SDN) technologies to virtually implement functions for a core network to support 4G, 5G, or a combination of 4G and 5G mobile network-capable devices. These devices include user equipment (UE), for example, smartphones, personal computers, and IoT devices such as sensors, automation equipment, smart systems, and the like.

The enterprise mobile network delivery system includes, in an illustrative embodiment, a portal having a user interface that enables enterprise customers to manage their individual private cellular networks, on-board new mobile network services, and create profiles to specify radios, users, and service types. For example, the portal provides controls for the enterprise customer to add, delete, and/or pause users/UE and/or services, manage network configuration, monitor network state, and access billing and other commercial systems.

The enterprise mobile network delivery system includes a radio registration entity that interfaces with the enterprise-provided hardware. The radio registration entity provides access credentials, points the radios to appropriate network functions in the universal enterprise mobile network, and collects information from the radios to enable radio to core network connectivity. The profiles and collected radio information are stored in an active directory for tracking authorized radios, users, and UE as needed to support network operations and maintain a logical representation of the enterprise's specific private cellular network as implemented using the public network infrastructure. In an illustrative embodiment, an enterprise mobile network is instantiated using a logical slice of the mobile network infrastructure.

The radio registration entity is interoperable with a business support system (BSS) to enable SIM (subscriber identity module) provisioning for enterprise UEs and facilitate billing and other commercial processes for an enterprise mobile network. In an illustrative embodiment, enterprise-affiliated UE utilize white-labelled SIM cards and/or embedded SIMs (eSIMs) that are registerable with the enterprise's mobile network including radios and core network. The portal enables an enterprise customer to provision selected SIMs to authorize roaming services for UEs to connect to conventional public mobile networks when operating outside the range of the enterprise radios.

In an illustrative embodiment, a radio unit includes programming to perform automated discovery and connection processes with the universal enterprise mobile network. After on-boarding by an enterprise customer through the portal, a radio unit broadcasts a discovery signal to locate and engage with a radio registration entity and register with an enterprise mobile network. The registered radio unit receives a configuration file from the radio registration entity that points to appropriate core network functions and provides authentication credentials to enable the connection between the radio unit and the core network to be implemented.

The enterprise mobile network delivery system provides technical advantages to enterprise customers. The customer's private cellular network, as implemented with the enterprise-provided radios and the universal enterprise mobile network, operates on licensed radio spectrum with improved performance (e.g., increased bandwidth and reduced latency) and reliability compared to unlicensed Wi-Fi which is susceptible to interference. Security is improved because identity authentication is provided by the SIM card and connections between UE and the mobile network are encrypted by default. In addition, because the publicly shared universal enterprise mobile network is operated using centralized infrastructure, the cloud-based service provider can more readily implement best practices for redundancy and disaster recovery compared to decentralized approaches taken by enterprises with standalone and isolated infrastructure.

The enterprise mobile network delivery system provides enterprise customers with flexible and quickly-deployable network solutions that are easily scalable because of the increased radio range, bandwidth, and supported UE capacity provided by 5G technology, compared to conventional Wi-Fi access points. Network planning and deployment cycles are shortened for enterprises because network capacity and configuration changes can be brought online quickly using the portal while all the underlying provisioning of the universal enterprise mobile network is handled transparently by the service provider. The enterprise need only provide radios, which are configurable in split RAN (radio access network) and/or integrated RAN designs, to implement a plug and play deployment architecture facilitated by the enterprise mobile network delivery system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter is capable of implementation as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 11 shows illustrative mobile network deployment configurations for different enterprises;

FIGS. 16, 17, and 18 show illustrative methods performed when implementing embodiments of the present enterprise mobile network delivery system;

Like reference numerals indicate like elements in the drawings. Elements are not drawn to scale unless otherwise indicated.

DETAILED DESCRIPTION

Figure 1:
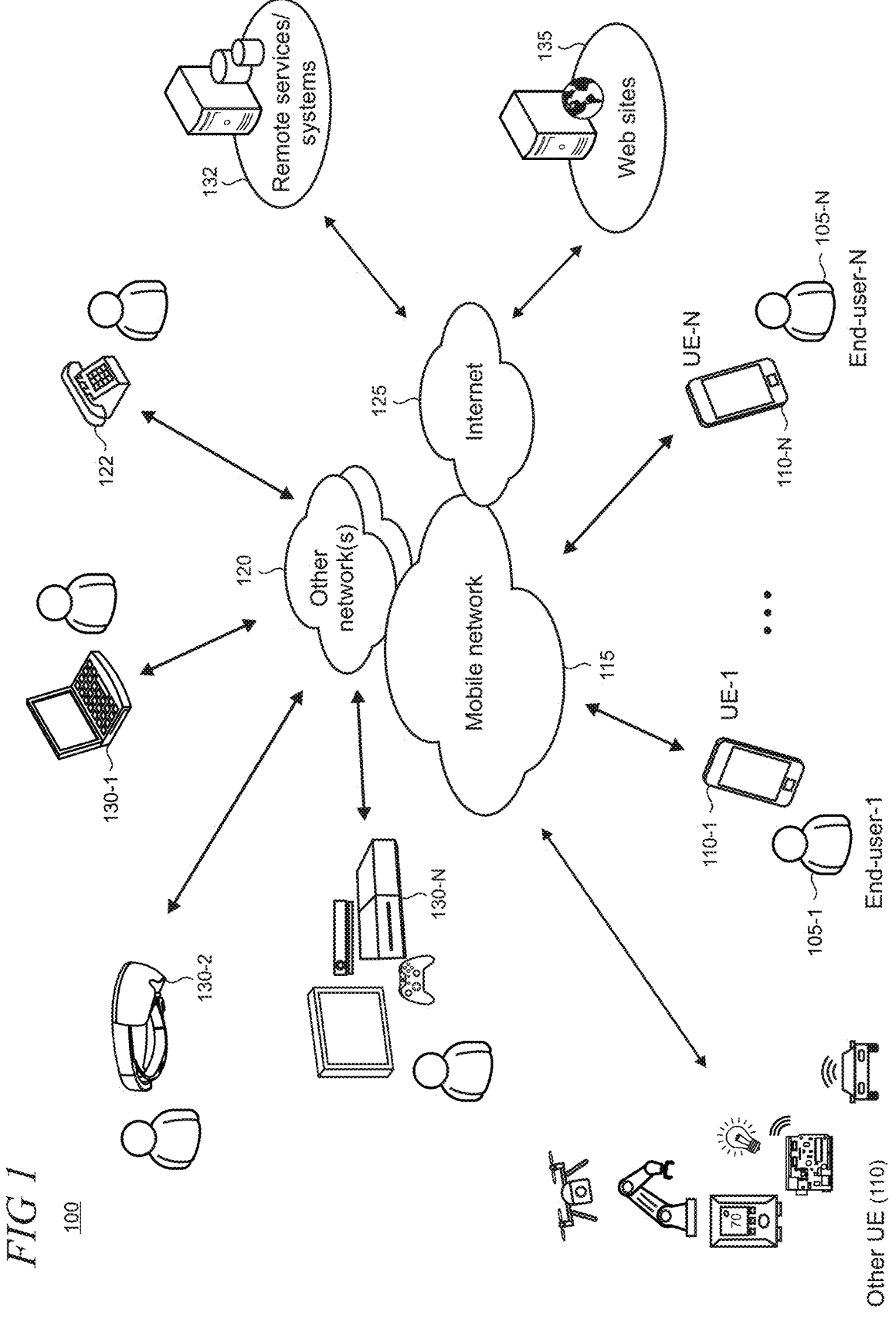
FIG. 1 shows an illustrative mobile telecommunications environment in which computing devices and associated users communicate over a mobile network with other devices and services.

FIG. 1 shows an illustrative telecommunications environment 100 in which the same or different end-users 105 employ various computing devices, generally referred to as "user equipment" (UE) 110, that communicate wirelessly with other computing devices and various services over a mobile network 115. In some cases, other networks (representatively indicated by reference numeral 120) are supported in the telecommunications environment. The networks 115 and 120 typically include different network types and network infrastructure in various combinations or subcombinations including cellular networks, satellite networks, IP (Internet-Protocol) networks such as WI-FI under IEEE 802.11 and Ethernet networks under IEEE 802.3, a public switched telephone network (PSTN), and/or short-range networks such as BLUETOOTH® networks.

Some of the end-users 105 and UE 110 have an association such as a subscription, contract, plan, or the like with one of the networks 115 and 120 (or are otherwise authorized to access and use the network), while other end-users and computing devices have an association with another one of the networks. The depiction of two networks in this example is illustrative, as the number of networks utilized in the telecommunications environment 100 can vary by implementation.

The UE 110 shown in FIG. 1 are representative of the wide variety of device types that utilize mobile networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. Other types of telephony equipment are optionally present in the telecommunications environment 100 such as conventional desktop phones 122 which are operatively coupled to a public switched telephone network ("PSTN"). Other examples include equipment that connects to the PSTN using private branch exchanges ("PBXs") and equipment coupled to call services that are accessed using telephone numbers. Other types of computing devices 130, such as personal computers (PCs), laptop computers, multimedia consoles, mixed- and virtual-reality display systems and the like are generally configurable and equipped to support telephony applications in some cases.

The mobile network 115 includes interfaces supporting connections to public networks such as the Internet 125 so that UE 110 is enabled to access content and render end-user experiences provided by various remote or cloud-based application services 132 and websites 135. The application services and websites typically support a diversity of features, services, and end-user experiences such as social networking, mapping, news and information, entertainment, travel, productivity, finance, electronic commerce (e-commerce), etc. The application services and websites are collectively referred to as application services in the description that follows.

Figure 2:
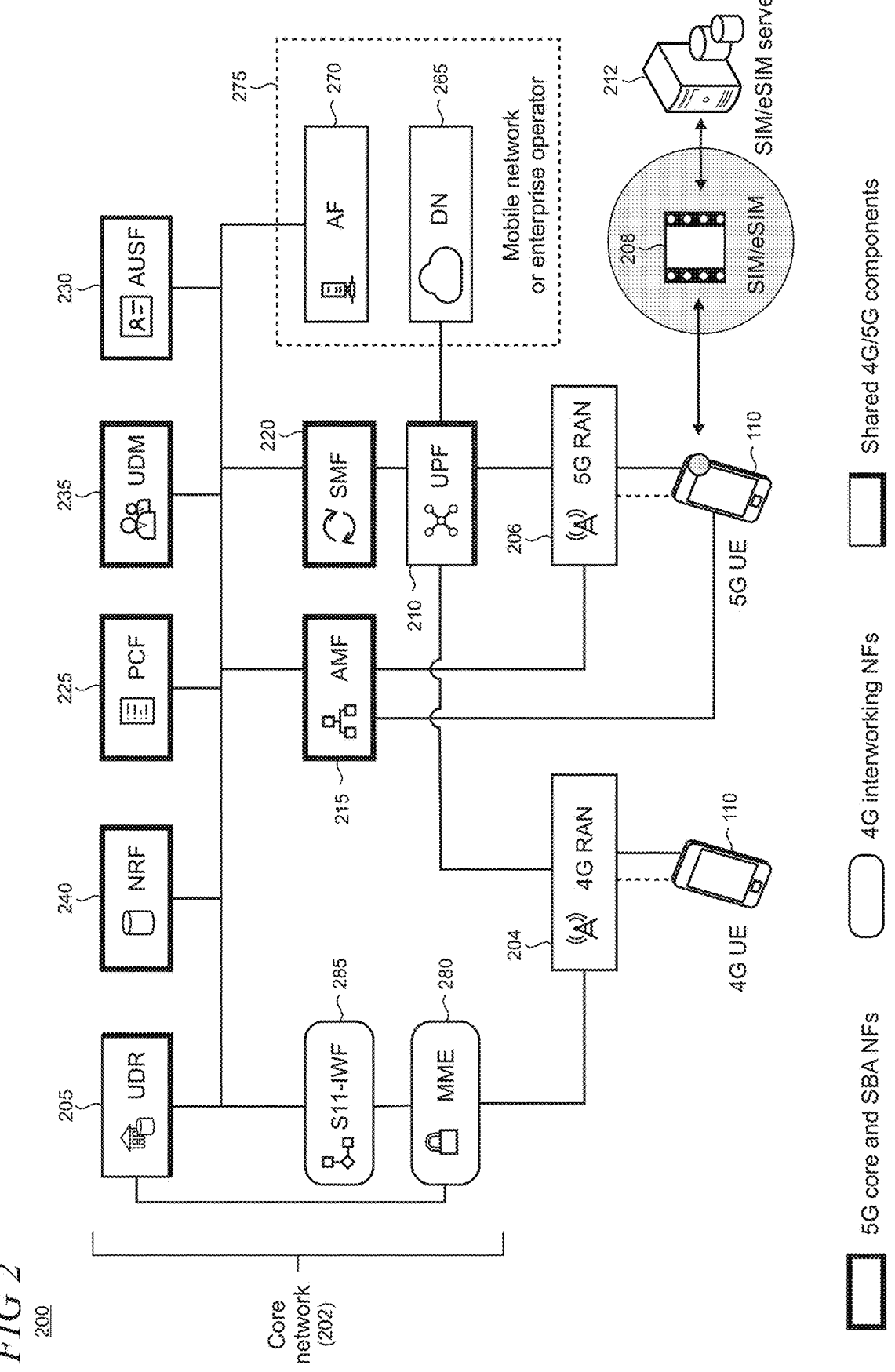
FIG. 2 shows an illustrative mobile network that uses a service-based architecture.

FIG. 2 shows an illustrative mobile network that uses a service-based architecture (SBA) 200 as defined by the 3GPP (3rd Generation Partnership Project). An SBA provides a modular framework from which common applications can be deployed using components of varying sources and vendors. Control plane functionality and common data repositories of the network are delivered by way of a set of Network Functions (NFs) that are interconnected with a service-based interface bus, in which each has authorization to access each other's services. Assuming the role of either service consumer or service producer, NFs are self-contained, independent, and reusable. Each NF service exposes its functionality through a Service Based Interface (SBI), which employs a well-defined REST (Representational State Transfer) interface using HTTP/2 (Hypertext Transfer Protocol Version 2).

As shown, the mobile network includes a core network (CN) 202 that is interoperable with 4G (fourth-generation) and 5G (fifth-generation) radio access networks (RANs) 204 and 206 that support wireless communications with UE 110. A UE includes a subscriber identity module (SIM) card 208 that stores information to identify the UE to the RAN. IoT devices typically utilize embedded SIMs (eSIMs) having a small form factor (the term "SIM" is used herein to collectively refer to SIMS and eSIMs). SIMS are capable of over-the-air provisioning, as discussed in the illustrative examples below, using a SIM server 212, for example, an SM-DP (subscriber management-data preparation) server described by the Global System for Mobile Communications Association (GSMA).

The CN 202 architecture 200 supports a 5G next generation core (NGC) network that includes 4G evolved packet core (EPC) instances to enable some 4G LTE (Long Term Evolution) use cases when implementing the present enterprise mobile network delivery system. With 4G mode, some 5G components such as the UDR (unified data repository) 205 and UPF (user plane function) 210 support 4G mode without the need to revert to a legacy 4G stack. Other 4G components include an MME (mobility management entity) 280 and IWF (interworking function) 285.

The UPF handles user data, performing operations such as maintaining PDU (Protocol Data Unit) sessions, packet routing and forwarding, packet inspection, policy enforcement for the user plane, QoS (Quality of Service) handling, traffic usage reporting for billing, and the like. The UPF further provides an interconnection point between the mobile network infrastructure and an external data network (DN) 265. The AF (application function) 270 provides service or application related information to a VNF service consumer, for example, a mobile network or enterprise operator 275.

The AMF (access and mobility management function) 215 receives all connection and session related information from the UE 110 but is responsible only for handling connection and mobility management tasks such as registration and authentication, identification, and mobility. All messages related to session management are forwarded over an interface to the Session Management Function (SMF) 220 that establishes and manages sessions. It also selects and controls the UPF 210 and handles paging. The AF (application function) 270 provides service or application related information to the NF service consumer. For example, the AF performs operations such as retrieving resources and exposing services to end-users 105. Other 3GPP-defined 5G network functions in the architecture 200 include SMF (session management function) 220; PCF (policy control function) 225; AUSF (authentication server function 230; UDM (unified data management) 235; and NRF (network repository function) 240.

Mobile networks provide satisfactory performance in many applications. However, mobile networks are not generally designed and deployed specifically for enterprises including, for example, businesses and organizations that typically need to support large numbers of users and equipment in a variety of settings and use environments. Enterprises often rely on macro-scale public services for cellular communications which can be difficult and time-consuming to plan, deploy, and scale according to business needs. Alternatives such as Wi-Fi are not always optimal solutions for enterprises due to technical limitations that can hinder performance and pose security vulnerabilities.

Figure 3:
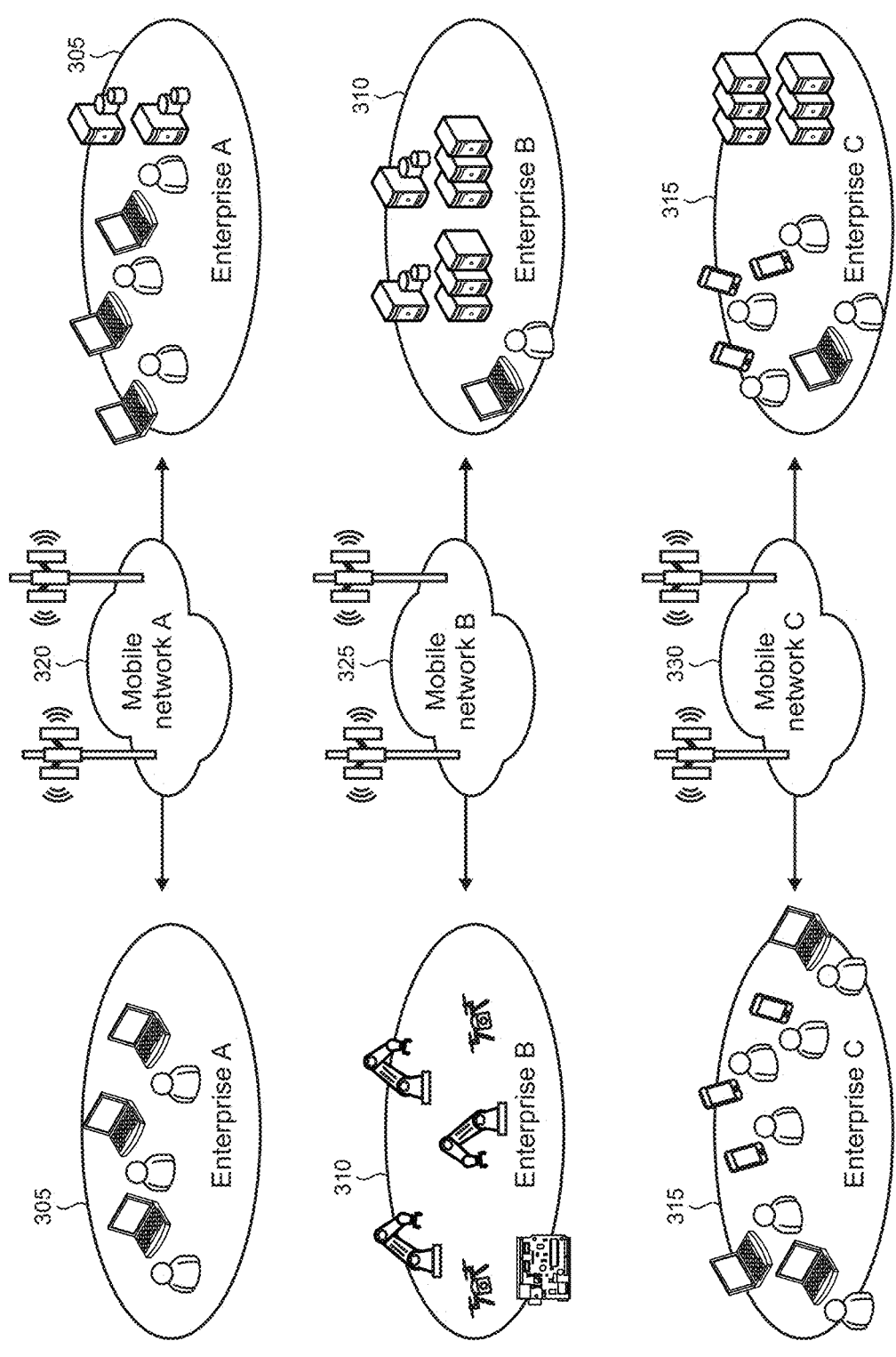
FIG. 3 shows illustrative conventional deployments of enterprise mobile networks.

FIG. 3 shows illustrative conventional deployments of enterprise mobile networks in which Enterprises A, B, and C (respectively indicated by reference numerals 305, 310, and 315) each build and maintain their own respective individual mobile networks 320, 325, and 330. Such deployments enable each enterprise to tailor their mobile networks to their particular technical requirements, locations, and size. However, the mobile networks are isolated and there is no standardization regarding how infrastructure is deployed, provisioned, and maintained. Such approach typically requires substantial capital investment and dedicated IT (information technology) staff. The mobile networks are also susceptible to data and service loss during disaster situations and performance and security are not assured or guaranteed. Scaling is typically complex because an enterprise's proprietary network architecture does not always lend itself to white box and COTS (commercial-off-the-shelf) solutions.

Figure 4:
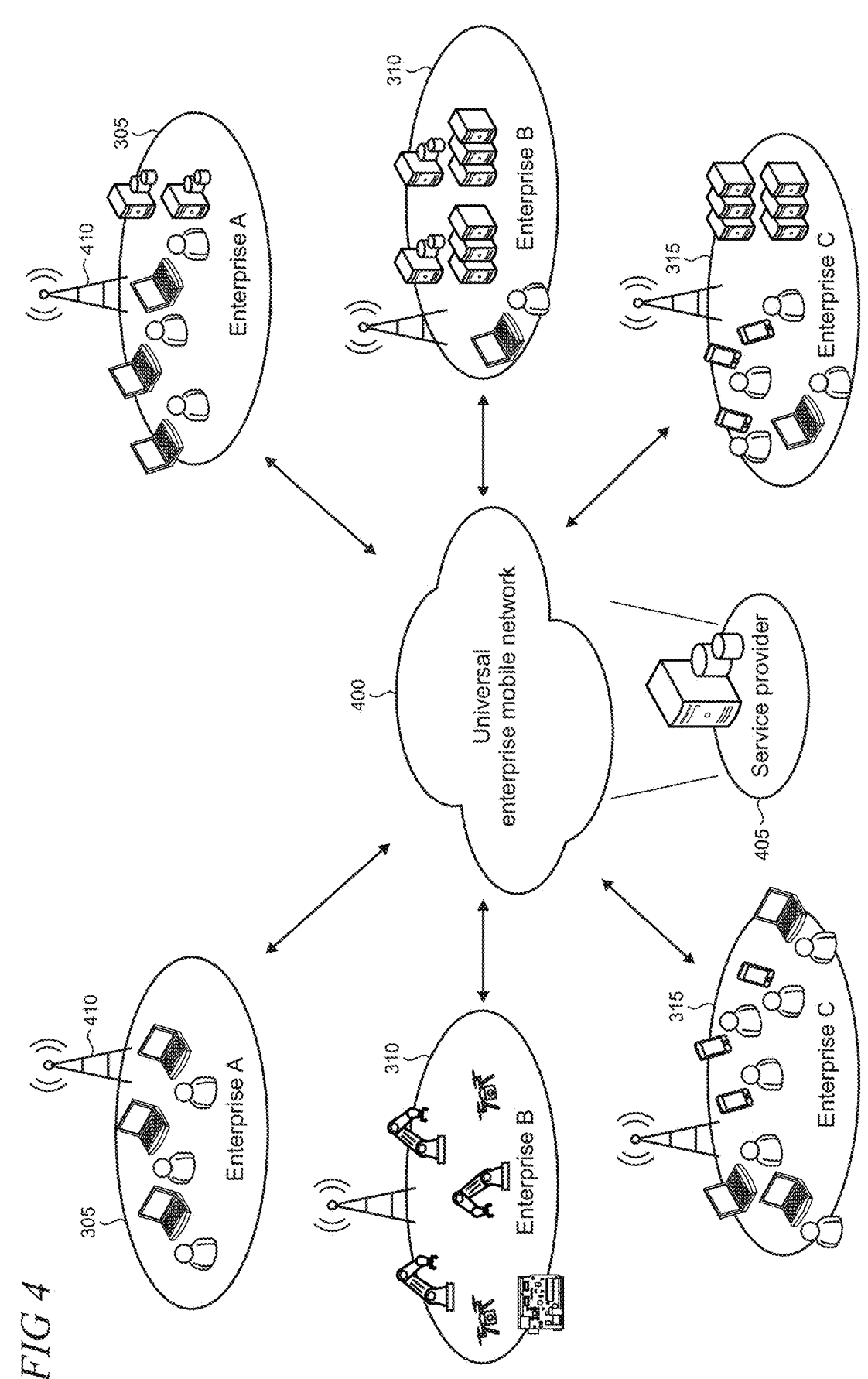
FIG. 4 shows an illustrative universal enterprise mobile network that is implemented using public cloud network infrastructure that is shared among multiple enterprises.

FIG. 4 shows an illustrative universal enterprise mobile network 400 that is implemented using public cloud network infrastructure that is shared among multiple enterprises in accordance with the present principles. The universal enterprise mobile network is supported by a service provider 405, for example, a public cloud service provider or hyperscaler cloud service provider. As shown, mobile network infrastructure deployment is split, in which radio access to UEs (as representatively indicated by reference numeral 410) is supported by the enterprise and the remaining mobile network is supported by the service provider. Such split infrastructure deployment advantageously enables consolidation of network functions within the universal enterprise mobile network while still enabling differentiated services to be tailored to the individual enterprises. Complexity, deployment time intervals, and costs are reduced for enterprises while network reliability and availability are increased without sacrificing the individualization that enterprises desire.

Figure 5:
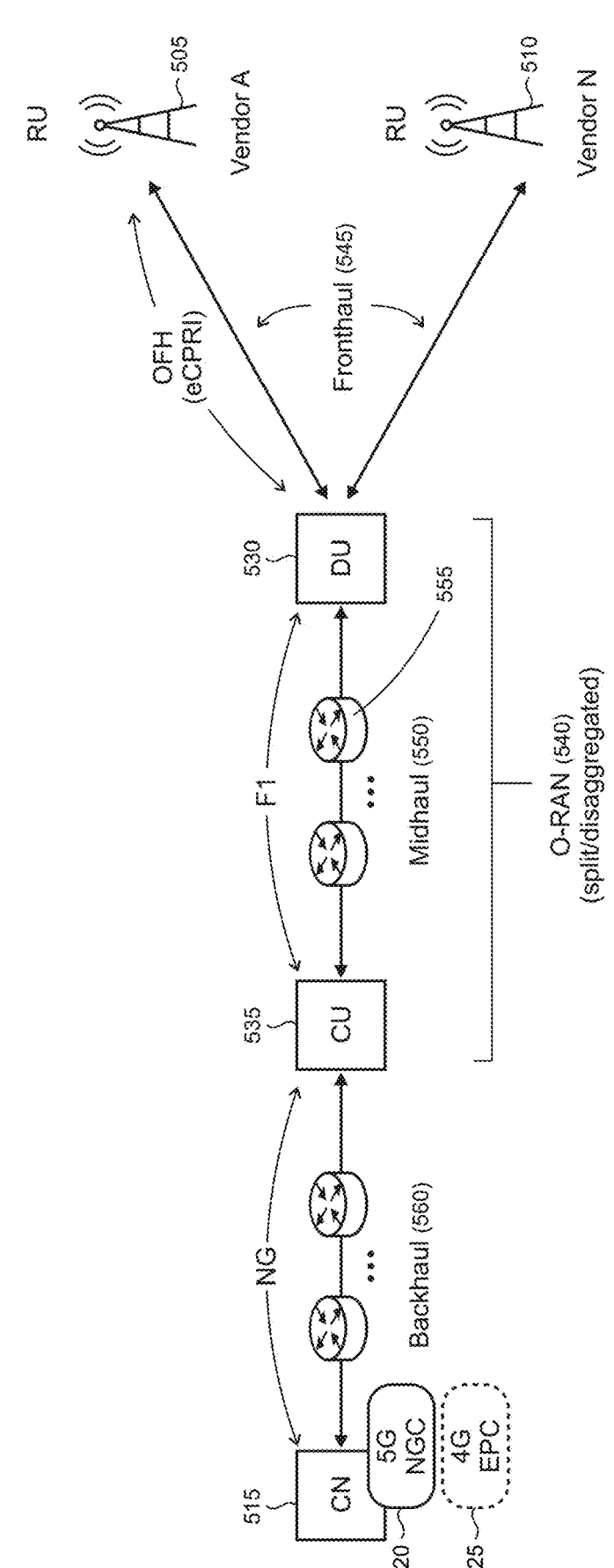
FIG. 5 shows an illustrative radio access network (RAN) architecture arranged in accordance with Open RAN (O-RAN) Alliance.

FIG. 5 shows an illustrative radio access network (RAN) architecture arranged in accordance with Open RAN (O-RAN) Alliance. The Open RAN protocol offers the option of placing NFs in different places along the signal path from radio units (RUs) 505 and 510, to the core network (CN) 515. In this illustrative example, the CN includes a 5G NGC 520 and optionally includes a 4G EPC 525, as indicated by the dashed rectangle. Under 0-RAN, the functions of proprietary baseband units in prior generation radio towers are logically disaggregated into a distributed unit (DU) 530 and a centralized unit (CU) 535 in the O-RAN 540. The DU is responsible for the real time layer 1 (L1, physical layer) and the lower layer 2 (L2) which contains the data link layer and scheduling functions. The CU is responsible for non-real time, higher L2 and L3 (network layer) functions.

The RUs 505 and 510 communicate over a fronthaul 545 to the DU 530 using an OFH interface that is implemented in this illustrative embodiment, for example, as enhanced Common Public Radio Interface (eCPRI). The eCPRI interface uses Ethernet as the L2 interface, which enables existing solutions for control, management, and synchronization to be utilized. Ethernet enables packet-based switching and statistical multiplexing of several O-RU connections onto a single transport fiber which can advantageously reduce radio deployment costs for enterprises. The DU 530 and CU 535 communicate over a midhaul 550 using an F1 interface. The midhaul typically includes network elements such as routers (representatively indicated by reference numeral 555). The CPU communicates with the CN 515 over a backhaul 560 using an NG interface.

Disaggregation of the O-RAN 540 requires hardware and software components to be interoperable which enables mixing and matching radio and RAN components from different vendors. For example, in some embodiments, an RU is advantageously implemented as a white box appliance using generic COTS hardware that can operate software from different vendors to implement desired functionality using open APIs (application programming interfaces). Enterprises can select an RU from various vendors based on quality and cost factors, for example, and easily provision equipment with new functionality or updates without affecting other parts of the mobile network. Such flexibility helps in reducing capital and operating expenditures associated with enterprise mobile network deployments and ongoing operations.

Figure 6:
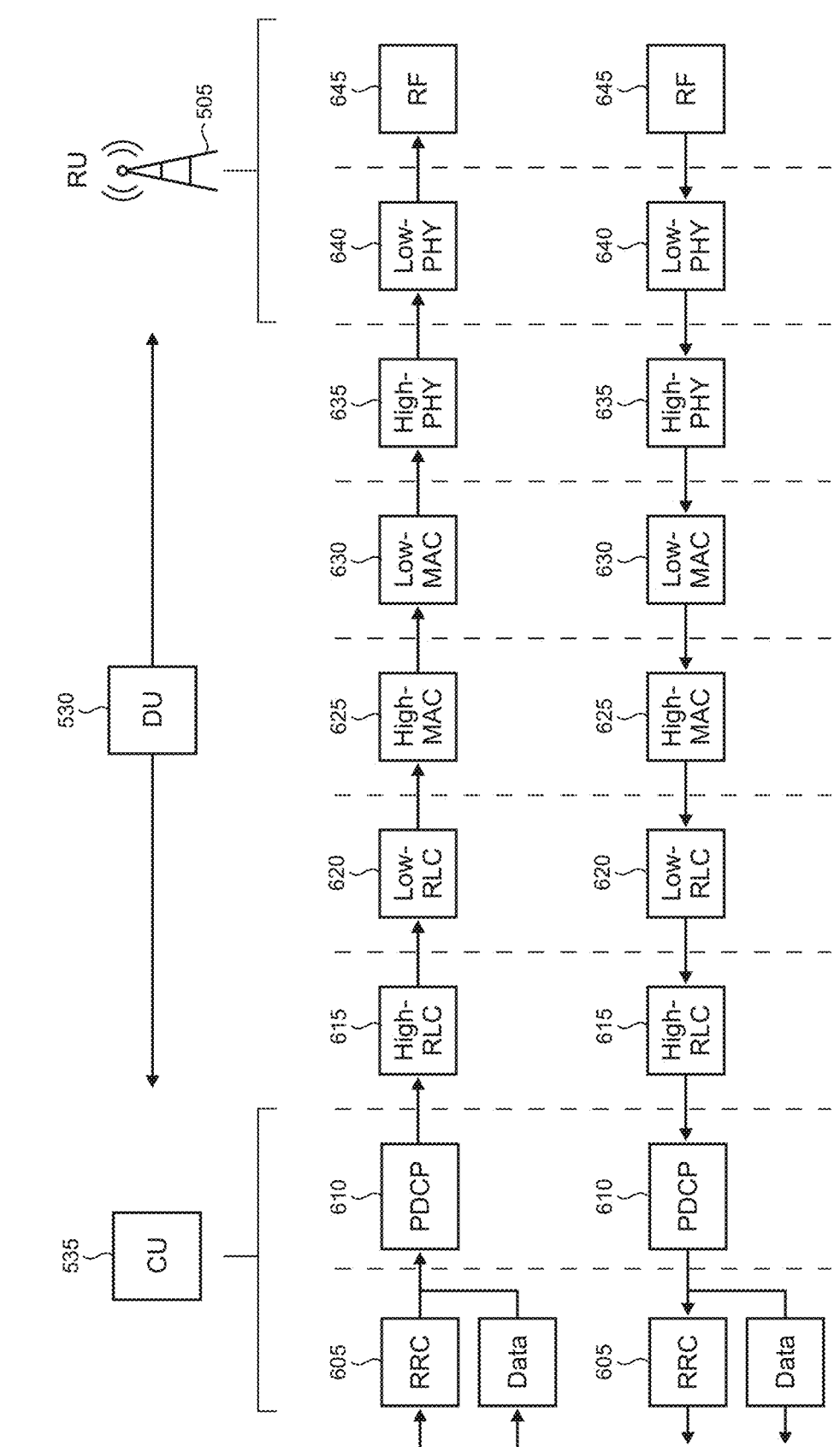
FIG. 6 shows illustrative options for splitting RAN functionality among a radio unit (RU), a distributed unit (DU), and a central unit (CU)

RAN disaggregation also enables tradeoffs in deciding which unit should control certain operations, referred to as the functional split. FIG. 6 shows illustrative options for splitting RAN functionality among RU 505, DU 530, and CU 535. As the functions are virtual, independent instances of DU and CU can share the same physical resources (e.g., servers). This enables different RAN services to run on the same hardware, while still fulfilling individual requirements of the enterprises. The functional split can vary by implementation. For example, Layer 3 functions, including RRC (radio resource control) 605 and PDCP (packet data convergence) 610, are implemented in the CU. Layer 2, including high and low RLC (radio link control) 615 and 620, high and low MAC (media access control) 625 and 630, and high Layer 1 including PHY (physical layer) 635, are implemented in the DU. Low PHY 640 and RF (radio functionality) 645 are implemented in the RU.

Figure 7:
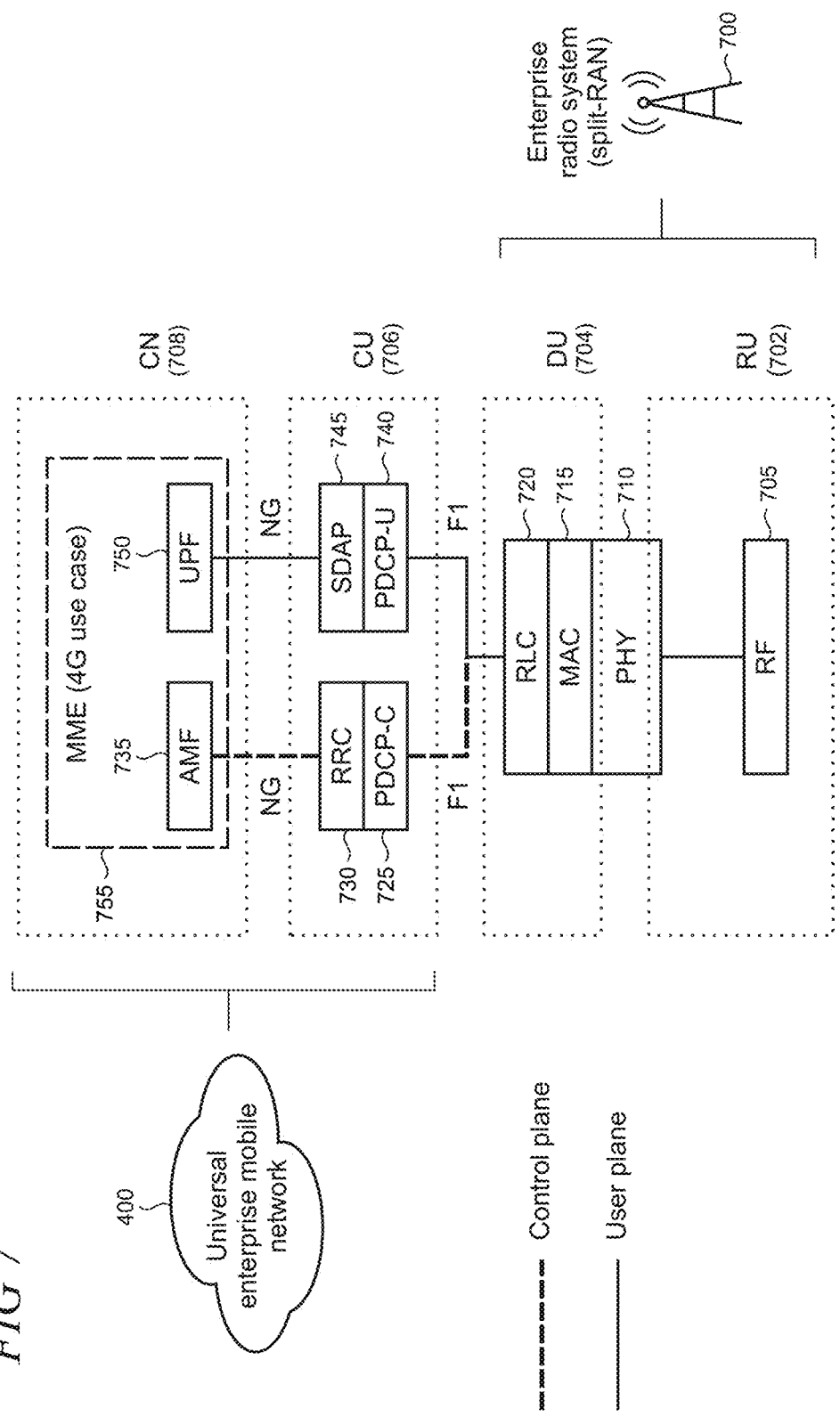
FIG. 7 shows an illustrative split of functionality between an enterprise radio system and the universal enterprise mobile network.

In an exemplary embodiment, an enterprise radio system 700 incorporates functions of an RU 702, including RF 705 and low PHY 710, and functions of a DU 704 including high PHY, MAC 715, and RLC 720, to implement an integrated physical device to simplify enterprise deployment, as illustratively shown in FIG. 7. In this embodiment, the split-RAN protocol under O-RAN is utilized such that the universal enterprise mobile network 400 supports functions of a CU 706. The CU interfaces with a CN 708 in the universal enterprise mobile network over an NG interface. For the control plane, the RLC 720 in the enterprise radio system interoperates over an F1 interface with the PDCP-C 725 in the CU supported by the universal enterprise mobile network. The RRC 730 interfaces with the AMF 735 in the CN over an NG interface. For the user plane, the RLC in the enterprise radio system interoperates over an F1 interface with the PDCP-U 740. The SDAP (service data adaptation protocol) 745 interfaces with the UPF 750 in the CN over an NG interface. For 4G use cases, an MME 755 provides equivalent functionality to the AMF and UPF.

Figure 8:
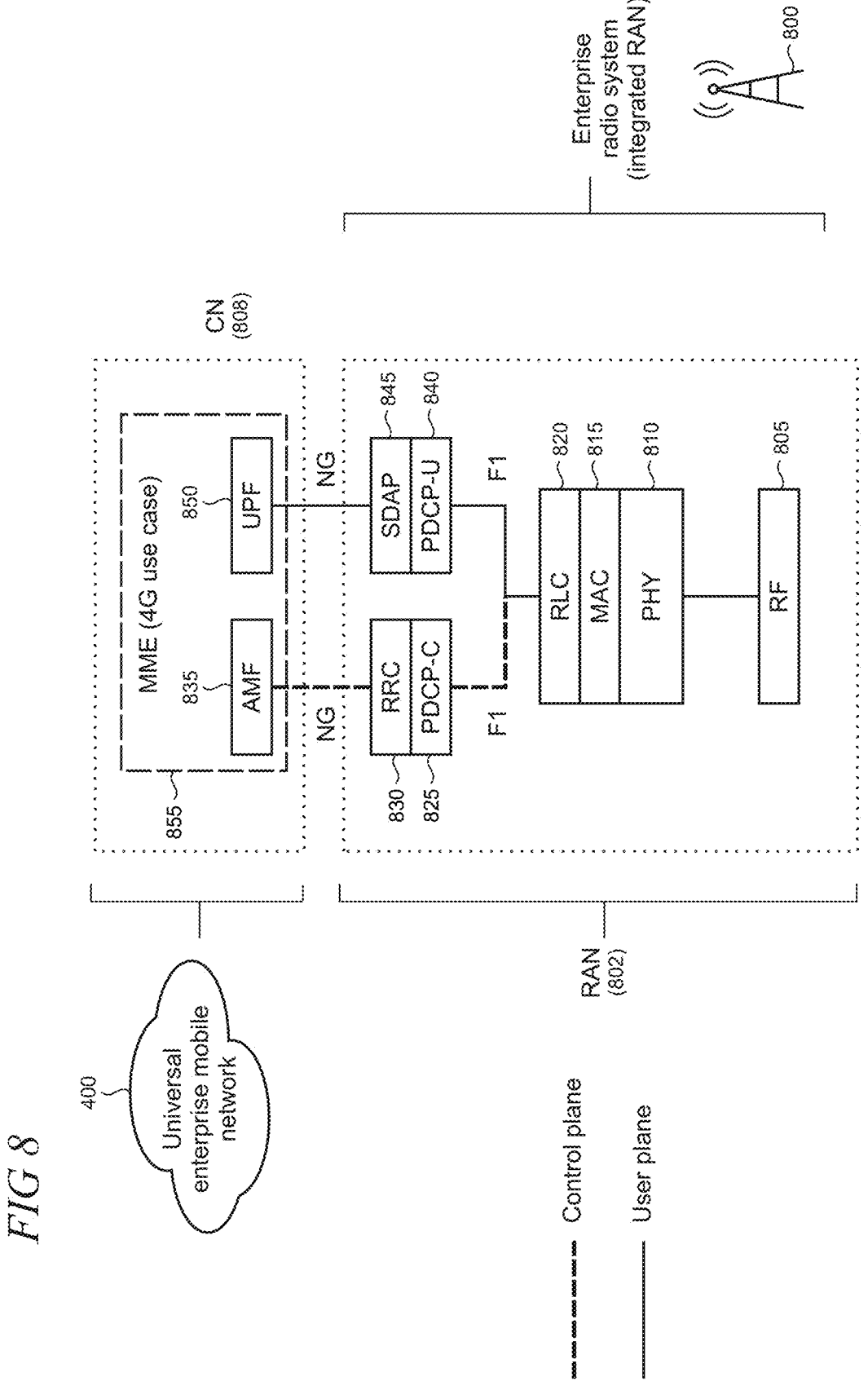
FIG. 8 shows an alternative illustrative split of functionality between an enterprise radio system and the universal enterprise mobile network.

FIG. 8 shows an alternative illustrative split of functionality between an enterprise radio system 800 and the universal enterprise mobile network 400. In an exemplary embodiment, an enterprise radio system 800 incorporates functions of the RU, DU, and CU in a single integrated physical package. This packaging architecture is referred to as integrated radio cell, or integrated RAN, and is often well adapted to pico and/or small cellular footprints. The integrated RAN package for cellular networks has similar deployment characteristics to access points used in Wi-Fi scenarios.

As shown, the enterprise radio system 800 includes functions for RF 805, PHY 810, MAC 815, RLC 820, PDCP-C 825, RRC 830, PDCP-U 840, and SDAP 845 to provide a RAN 802 that is packaged in a single device. For the control plane, the RLC 820 interoperates over an F1 interface with the PDCP-C. The RRC in the enterprise radio system interfaces with the AMF 835 in the CN 808 supported by the universal enterprise mobile network 400 over an NG interface. For the user plane, the RLC in the enterprise radio system interoperates over an F1 interface with the PDCP-U. The SDAP interfaces with the UPF 850 in the CN. As above, for 4G use cases, an MME 855 provides equivalent functionality to the AMF and UPF.

The functional splits shown in FIGS. 7 and 8 and described in the accompanying text are illustrative and not limiting. Various packaging and integration arrangements for the RAN and CN are utilizable depending upon the requirements of a particular implementation of the present enterprise mobile network delivery system.

Figure 9:
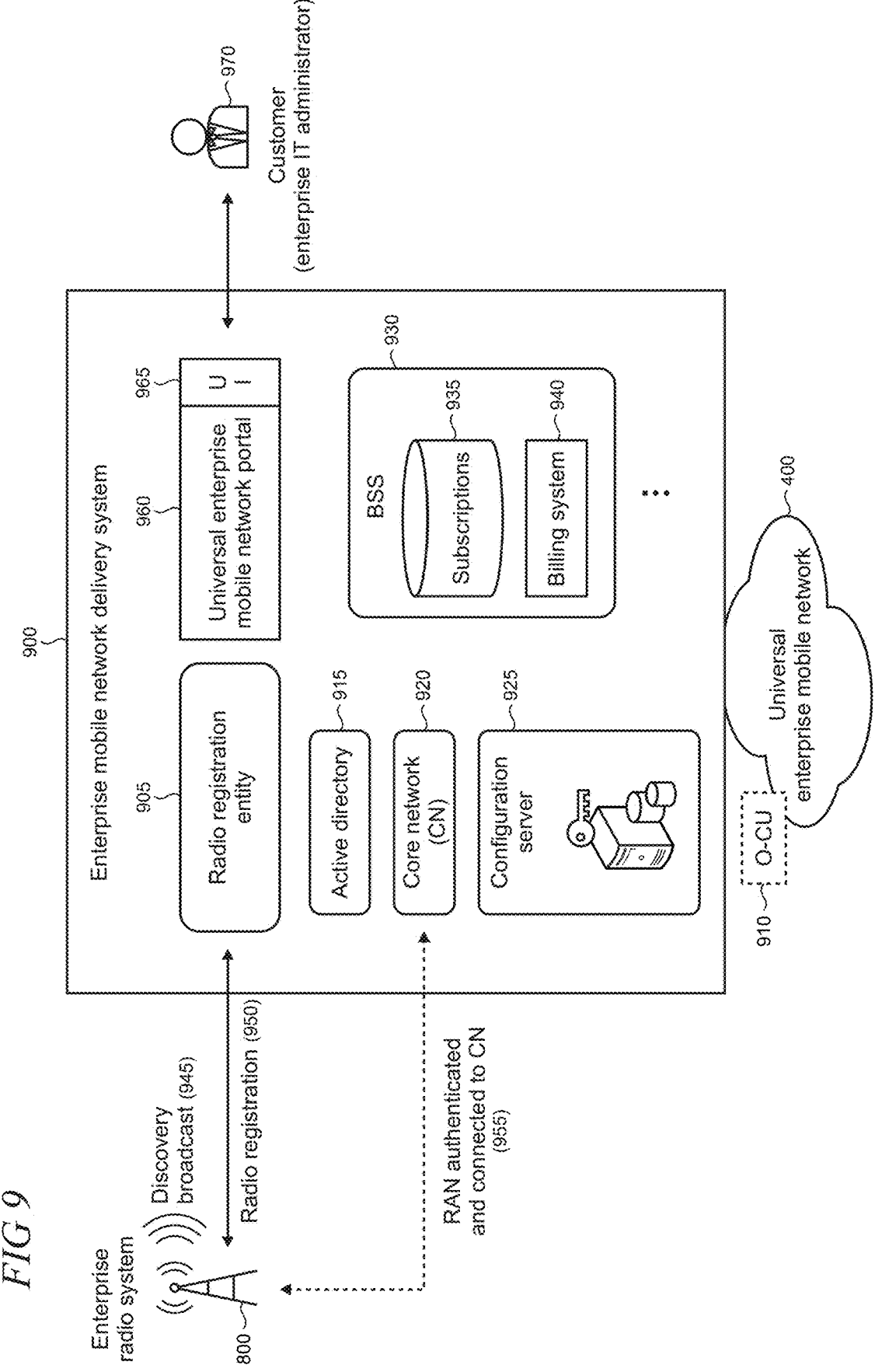
FIG. 9 shows illustrative components of the present enterprise mobile network delivery system.

FIG. 9 shows illustrative components of an enterprise mobile network delivery system 900 arranged in accordance with the present principles. The delivery system operates with the universal enterprise mobile network 400 and is typically operated by a common service provider. However, in some implementations, the universal enterprise mobile network and delivery system are operable by different entities. The enterprise mobile network delivery system utilizes various functionalities that are supported by, or incorporated into, the universal enterprise mobile network, or are separately instantiated from the network. These functionalities include active directory 915, CN 920, configuration server 925, and business support system (BSS) 930. The BSS includes a subscriptions database 935 and billing system 940.

The configuration server 925, in this illustrative embodiment, is implemented as a trusted server that operates as a certificate authority. The configuration server provides the necessary certificates to enable the enterprise radio system to be authenticated when connecting to the CN 920, as discussed in more detail in the text accompanying FIG. 14 below.

The enterprise mobile delivery system 900 includes a radio registration entity 905 that interoperates with an enterprise radio system 800. In this illustrative example, the enterprise radio system 800 is implemented using an integrated RAN as described above in the text accompanying FIG. 8 above. In implementation scenarios in which a split-RAN configuration is utilized for the enterprise radio system, the functionalities of a CU 910 are supported by the universal enterprise mobile network 400, as indicated by the dashed rectangle.

As discussed in more detail below, the radio registration entity 905 supports registration of the enterprise radio system in response to a discovery broadcast, as indicated by reference numeral 945. The radio registration process 950 enables the RAN 802 (FIG. 8) supported by the enterprise radio system 800 to be authenticated and connected to the CN 920, as indicated by reference numeral 955.

Figure 10:
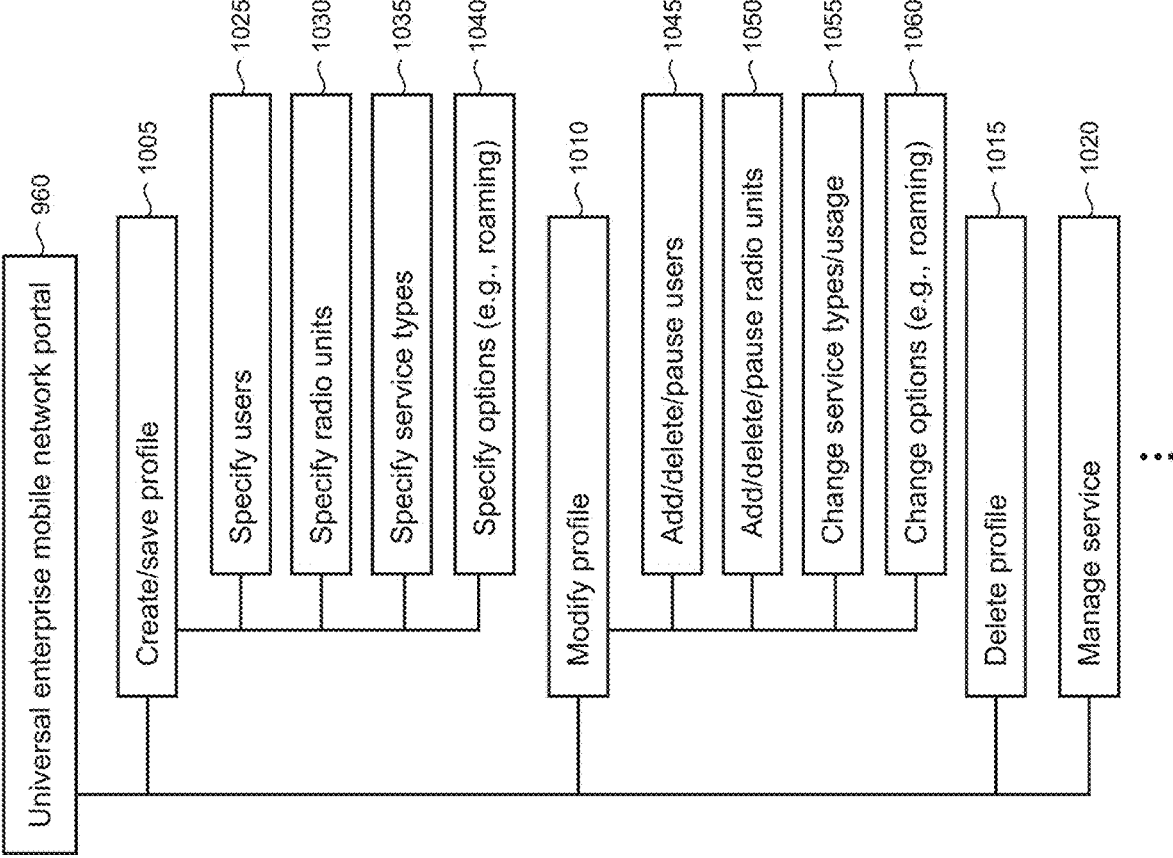
FIG. 10 shows illustrative user interface controls exposed by the universal enterprise mobile network portal.

The delivery system 900 further includes a universal enterprise mobile network portal 960 that exposes a user interface (UI) 965 to a customer 970, such as an enterprise IT administrator. The UI of the portal exposes various controls to manage a configuration of a given instance of an enterprise mobile network, as illustratively shown in FIG. 10. As shown, the controls enable a profile to be created and or saved 1005, modified 1010, or deleted 1015. The customer's service accounts are manageable by accessing control 1020 to surface appropriate management tools dealing, for example, with network configuration, network state monitoring, and billing and other commercial terms and conditions.

The create/save profile control 1005 enables the customer to specify users 1025, radio units 1030, and service types and usage 1035. A specify options control 1040 enables the customer to set UE configuration options such as roaming. The modify profile control 1010 enables the customer to add, delete, and/or pause (i.e., suspend) users 1045, add, delete, and/or pause radio units 1050, and change service types and usage 1055. A change options control 1060 enables the customer to change UE configuration options such as roaming.

FIG. 11 is a table 1100 showing illustrative mobile network deployment configurations for different Enterprises A, B, and C, as respectively indicated by reference numerals 1105, 1110, 1115. As shown, using the universal enterprise mobile network portal 960 (FIG. 9), a customer associated with Enterprise A has specified an enterprise mobile network having 50 radio systems and 100 supported users. The service type is data and roaming to a public mobile network is enabled. An Enterprise customer B has specified an enterprise mobile network having 200 radio systems with 1000 supported users. The service type is IoT, and roaming is not enabled. An Enterprise customer C has specified an enterprise mobile network having 10 radio systems supporting 200 users. The service type includes both data and voice, and roaming is enabled. The roaming option is discussed further in the text accompanying FIG. 15 below.

Figure 12:
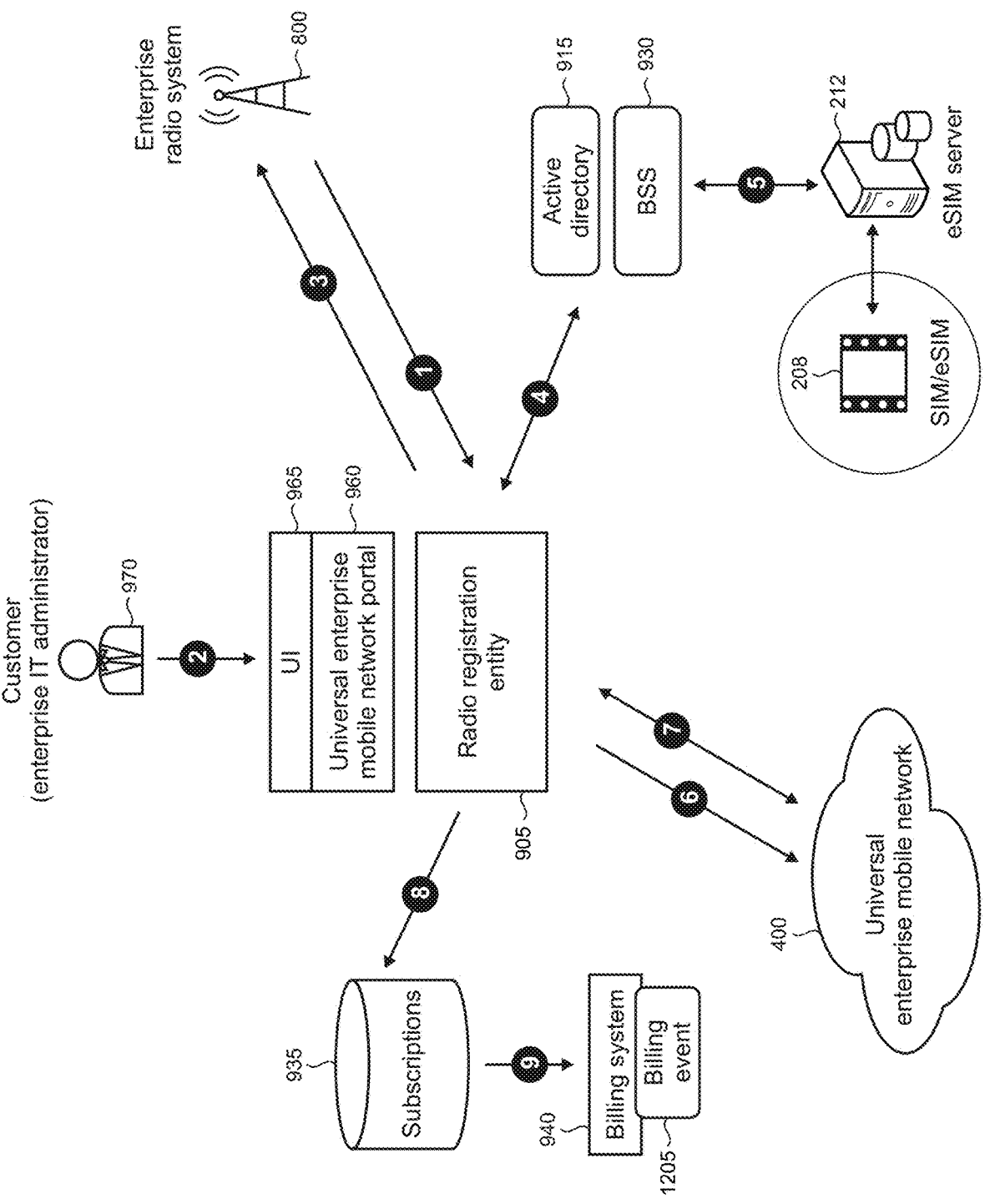
FIG. 12 shows an illustrative overview of operations of the present enterprise mobile network delivery system.

FIG. 12 shows an illustrative overview of operations of the present enterprise mobile network delivery system. The sequence of steps shown is exemplary to highlight features of the system and the operations are not necessarily limited to any particular sequence or order. At step 1, the enterprise radio system 800 registers with the radio registration entity 905. At step 2, the customer 970 accesses the portal 960 using the UI 965 to manage enterprise mobile network configuration by specifying, for example, radios, users, and/or service types. In an illustrative example, the customer specifies that particular instances of radio systems are authorized for use with the enterprise mobile network in which the radios are identifiable by device ID, location, and the like. In an exemplary embodiment, the authorization information is saved in a registry or other suitable data structure.

At step 3, the radio registration entity enables an enterprise mobile network to be constructed by pointing an authorized enterprise radio system to appropriate network functions in the universal enterprise mobile network to thereby connect the RAN to the CN. In an illustrative embodiment, the network functions are associated with a particular slice of the universal enterprise mobile network (network slicing is discussed below in the text accompanying FIG. 19). At step 4, the radio registration entity 905 shares registration data with the active directory 915 to obtain verification that the radio system is authorized to connect to the CN of the universal enterprise mobile network 400. At step 5, the BSS 930 communicates with the eSIM server 212 to provision UE SIMs 208 over the air to enable wireless communications between the UEs and the authorized enterprise radio system.

At step 6, authorized enterprise radio system information is pushed to the CN of the universal enterprise mobile network 400. At step 7, the universal enterprise mobile network confirms its successful installation of the enterprise radio system in the CN. At step 8, the radio registration entity 905 provides an update to the subscriptions database 935 which, in turn at step 9, causes an appropriate billing event 1205 to be created at the billing system 940 to reflect the installation of an additional radio system for the enterprise.

Figure 13:
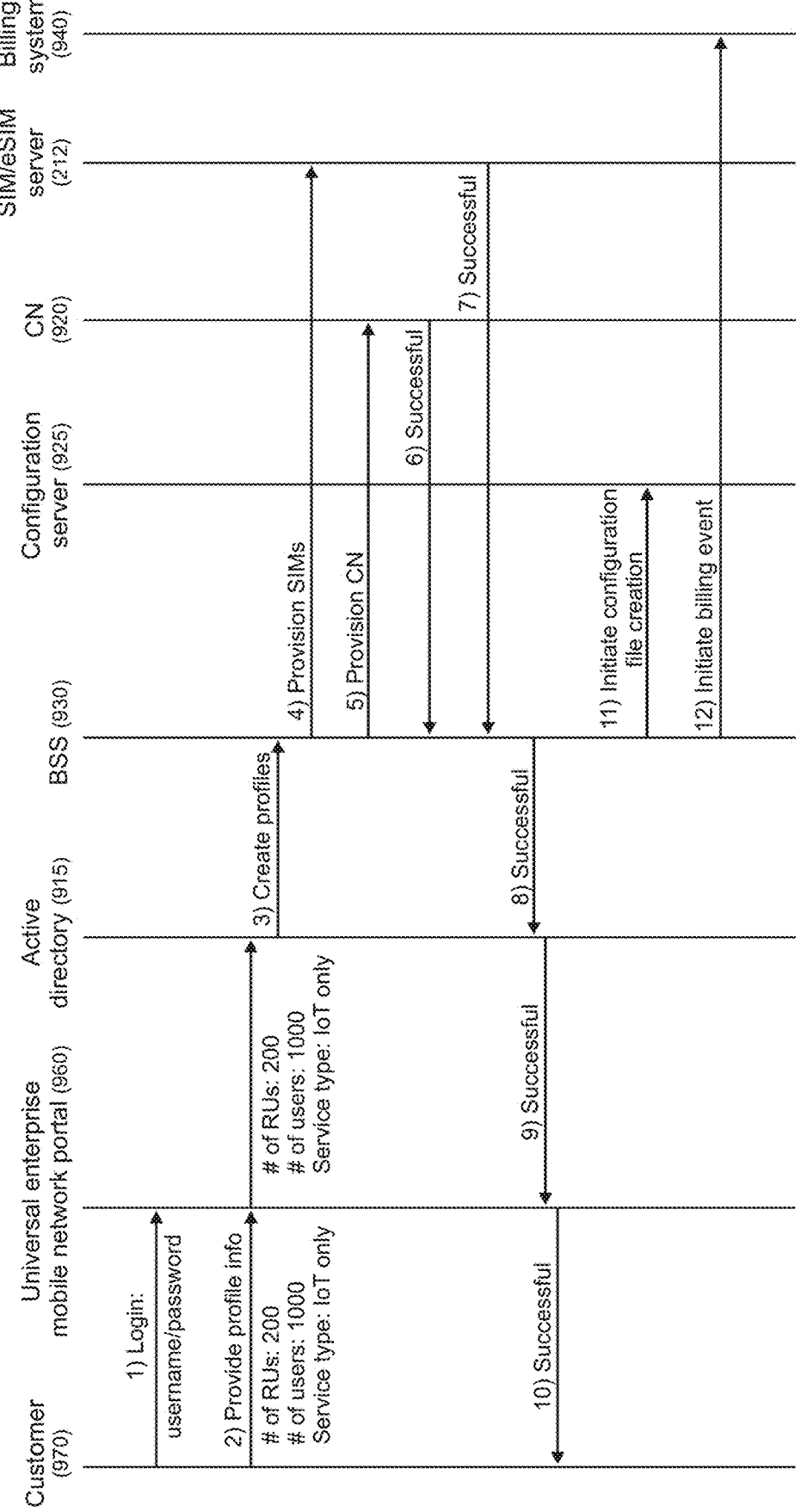
FIG. 13 shows an illustrative detailed signal flow associated with on-boarding new mobile network services when implementing embodiments of the present enterprise mobile network delivery system.

FIG. 13 shows an illustrative detailed signal flow associated with on-boarding new mobile network services when implementing an exemplary embodiment of the present enterprise mobile network delivery system 900 (FIG. 9). Signal 1 includes the customer 970 providing login credentials to the universal enterprise mobile network portal 960. Signal 2 includes the customer providing profile information for a new account for service on the universal enterprise mobile network 400 (FIG. 4) including a number of radios and users to be on-boarded and service type. In this illustrative example, the new service account corresponds to entry 1110 for Enterprise B shown in Table 1100 in FIG. 11. The profile information is provided to the active directory 915 which creates appropriate profiles in signal 3 and passes them to BSS 930. In response, the BSS interfaces with the SIM server 212 in signal 4 to invoke over-the-air provisioning of SIMS in the UEs specified in the profile.

The BSS 930 provides profile data in signal 5 to provision CN 920. The CN reports successful CN provisioning to the BSS based on the profile data in signal 6. The SIM server reports successful SIM provisioning to the BSS based on the profile data in signal 7. The successful provisioning of the UEs and CN is reported to the active directory 915 and universal enterprise mobile network portal 960 with signals 8 and 9, and the customer 970 is informed of successful provisioning with signal 10.

Based on the successful provisioning, the BSS 930 initiates creation of a CN configuration file at the configuration server 925 with signal 11. The BSS initiates creation of a suitable billing event at the billing system 940 with signal 12 to reflect the creation of the new service account.

Figure 14:
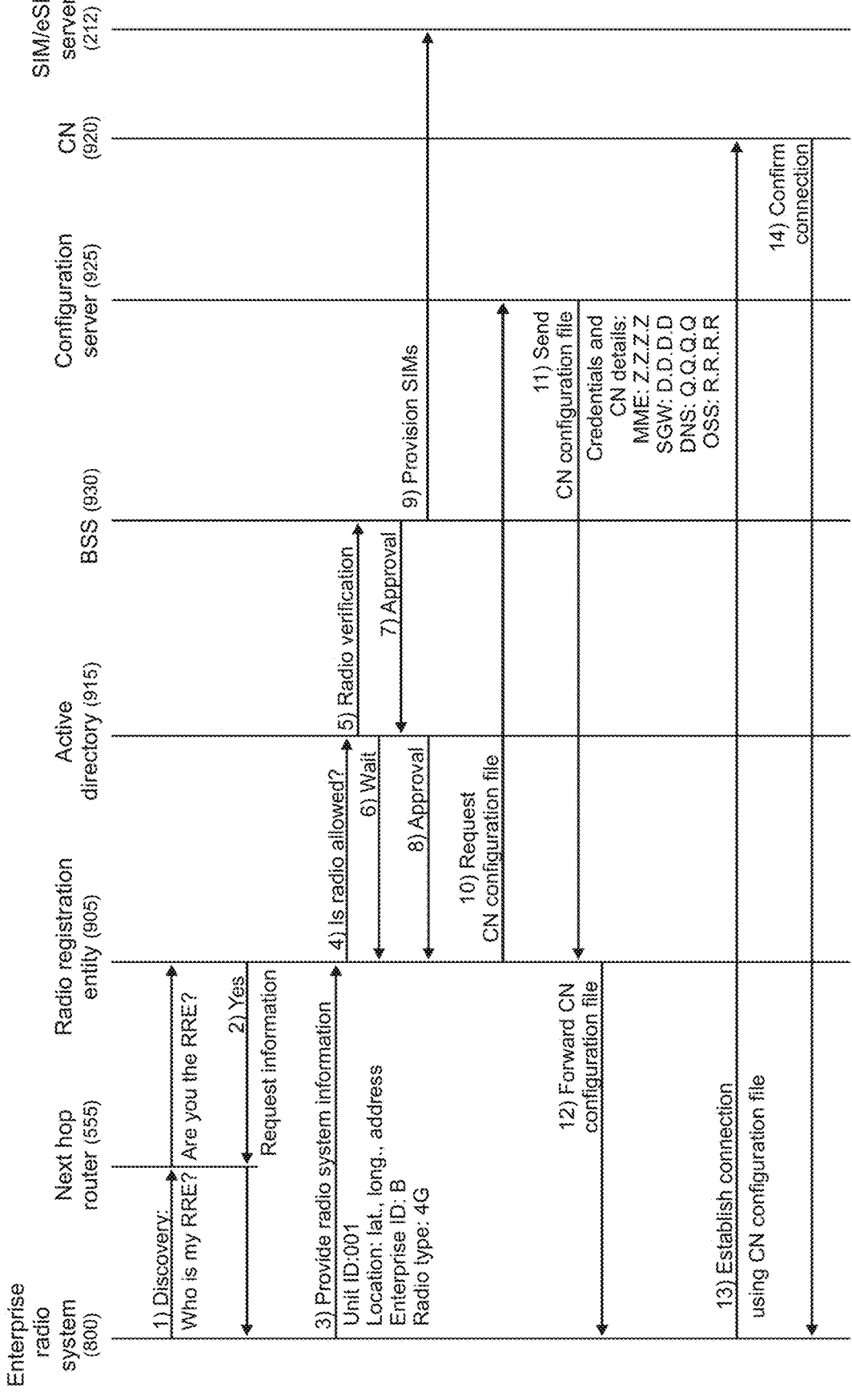
FIG. 14 shows an illustrative detailed signal flow associated with automated processes for radio registration entity discovery, radio unit registration, and connection establishment when implementing embodiments of the present enterprise mobile network delivery system.

FIG. 14 shows an illustrative signal flow associated with automated processes for radio registration unit discovery, radio unit registration, and connection establishment when implementing an exemplary embodiment of the present enterprise mobile network delivery system 900 (FIG. 9). Signal 1 includes an RF discovery broadcast from the enterprise radio system 800 to advertise its presence to facilitate locating and identifying a suitable radio registration entity and requesting CN connectivity. The discovery broadcast is received by a router 555 at the next hop on the transmission path between the radio system and the radio registration entity 905. The radio registration entity confirms the discovery request with signal 2 and requests relevant information be returned from the enterprise radio system. The enterprise radio system responsively provides information including identification and technical specifications such as location and radio type (e.g., 4G or 5G, as appropriate) with signal 3.

Based on the radio information, the radio registration entity 905 communicates with the active directory 915, using signal 4, to determine whether the requesting enterprise radio system is authorized by the enterprise customer. The active directory uses signal 5 to verify that the radio system is authorized with the BSS 930 and instructs the radio registration entity to wait pending approval with signal 6. The BSS provides approval of the connection request to the active directory with signal 7 which is relayed to the radio registration entity with signal 8. With signal 9, the BSS initiates over-the-air SIM provisioning by the SIM server 212 using the radio system information.

In response to verification that the radio system is approved, the radio registration entity 905 requests a CN configuration file from the configuration server 925 with signal 10. The CN configuration file includes information to point the enterprise radio system 800 to appropriate instances of network functions in the CN (which includes slice information in some cases) along with authentication credentials to thereby enable a secure connection to be implemented according to the security architecture specified by 3GPP TS 33.501. The CN configuration file is provided to the radio registration entity with signal 11 and is forwarded to the enterprise radio system with signal 12.

The enterprise radio system establishes a connection with the CN 920 using the CN configuration file with signal 13. The CN confirms the connection with the enterprise radio system with signal 14.

Figure 15:
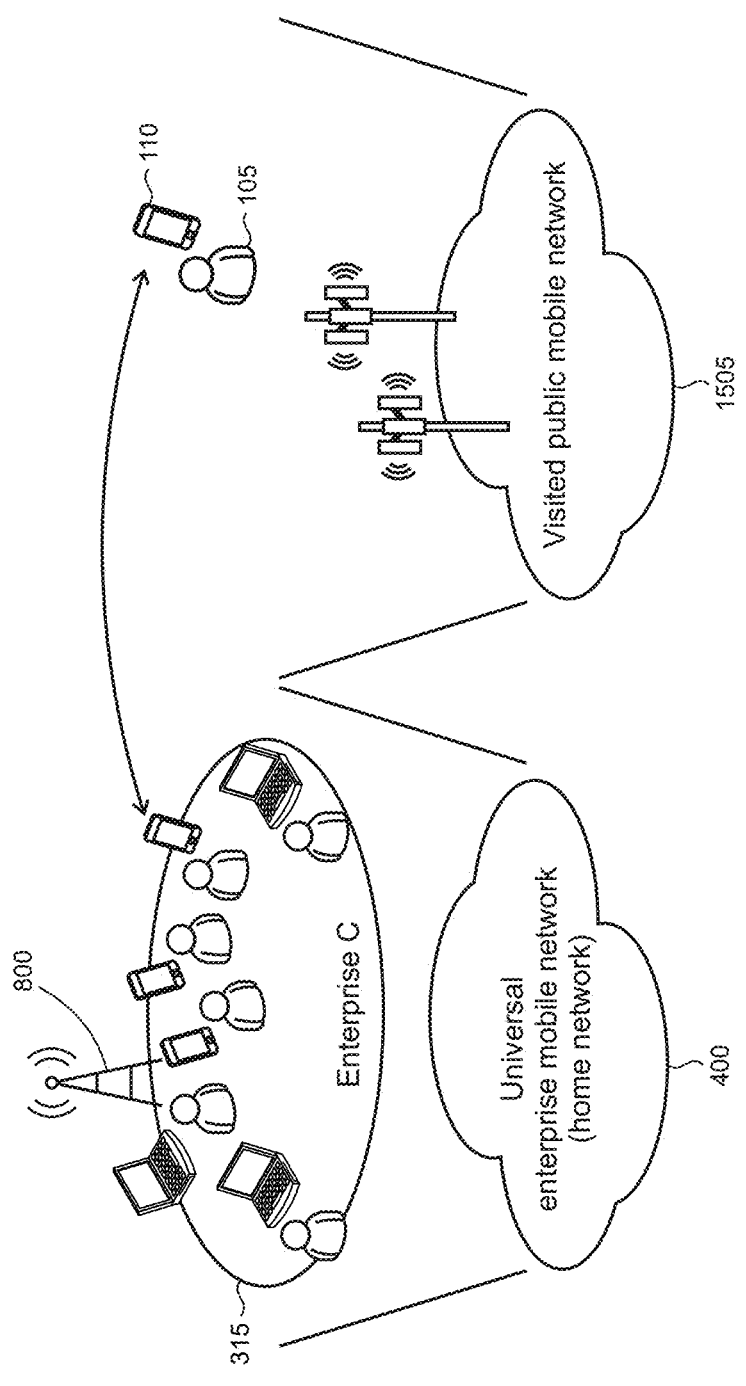
FIG. 15 shows an illustrative roaming scenario for UE on a visited public mobile network.

As discussed above, SIMs 212 in the UE 110 are provisioned to reflect profiles established by an enterprise customer using the universal enterprise mobile network portal 960 (FIG. 9). In cases in which the profile includes roaming, SIMs are provisioned by the BSS 930 to enable roaming on public mobile networks. FIG. 15 shows an illustrative roaming scenario for UE 110 on a visited public mobile network 1505. In this illustrative embodiment, the universal enterprise mobile network 400 functions as the UE's home network for Enterprise C 315. When the UE travels beyond the range of the enterprise radio system 800, it can access the visited public mobile network. Roaming is typically supported with an appropriate commercial agreement between the enterprise and the visited mobile network operator.

FIG. 16 is a flowchart of an illustrative method 1600 that is performable by a computing device for implementing a radio registration entity in an enterprise mobile network delivery system. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps are optionally utilized.

Block 1605 includes operating a core network in a software-defined mobile network supporting wireless communications for user equipment. Block 1610 includes providing a radio registration entity in operative communications with the core network, the radio registration entity interoperating with a radio unit supporting the wireless communications with the user equipment. Block 1615 includes receiving a discovery broadcast from the radio unit at the radio registration entity requesting a connection to the core network. Block 1620 includes operating the radio registration entity to determine eligibility of the radio unit to establish the connection to the core network. Block 1625 includes, in response to the determination, sending a core network configuration file to the radio unit from the radio registration entity, the core network configuration file identifying instances of network functions in the core network with which the radio unit implements the connection to the core network, the implemented connection enabling the wireless communications from the user equipment to be transported by the mobile network through the radio unit.

FIG. 17 is a flowchart of an illustrative method 1700 that is performable by a computing device for instantiating an enterprise mobile network delivery system. Block 1705 includes providing a business support system for managing billing for an enterprise mobile network, the enterprise mobile network comprising a radio access network and a core network. Block 1710 includes providing an active directory for tracking authorization for radio units in the radio access network. Block 1715 includes providing a configuration server in operative communications with the business support system, the configuration server providing information to enable authorized radio units to connect to the core network of the enterprise mobile network, wherein the business support system initiates a billing event responsively to an authorized radio unit being connected to the core network.

FIG. 18 is a flowchart of an illustrative method 1800 that is performable by a computing device that instantiates an enterprise mobile network delivery system that exposes a portal with a user interface for creating and saving profiles. Block 1805 includes implementing an enterprise mobile network delivery system providing registration of enterprise-provided cellular radio units with a core network of a mobile network, the core network being implemented using public cloud infrastructure, wherein the mobile network supports a plurality of service accounts associated with different enterprises. Block 1810 includes providing a portal exposing the user interface to enable a user to create and save a profile for a new service account, the profile providing identifying information for the radio units associated with the new service account. Block 1815 includes, based on the profile, using the enterprise mobile network delivery system to register the radio units associated with the new service account with the core network.

As noted above, a given enterprise mobile network is implemented as a mobile network slice in some embodiments. With 5G, mobile networks are optimizable as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice is dynamically created consisting of an end-to-end composition of all the varied network resources and infrastructure needed to satisfy the specific performance and requirements of a particular service class or application that meets some pre-defined service level agreement (SLA). Each portion of the 5G network is respectively sliced such that the network can be viewed as being composed of RAN slices, mobile core slices, cloud slices, etc. 5G network slicing thus enables creation of multiple logical and secure networks that are isolated from each other, but which span over the same common physical network infrastructure.

5G network slices consist of resources composed into an end-to-end service delivery construct. These include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they are sharable across multiple slices. These resources are not necessarily all produced within the mobile network provider as some comprise services consumed from other providers, facilitating, for example, aggregation, cloud infrastructure, roaming, etc.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). Standardized 3GPP network slices of a 5G network include eMBB (enhanced Mobile Broadband) (SST=1), URLLC (ultra-reliable low latency communications) (SST=2), and MIoT (massive Internet of Things) (SST=3) which correspond to the usage scenarios described by ITU-R 2083-0. Additional standardized SST values for V2X (Vehicle-to-Everything) (SST=4) and HMTC (High-Performance Machine Type Communications) (SST=5) are also defined by 3GPP. Slice service types beyond those having standardized SST values can also be defined.

IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and span all the domains of the underlying physical infrastructure, such as the transport network supporting flexible locations of functions, dedicated radio configurations or specific radio access technologies (RATs), and the mobile core network. Network slices can also be deployed across multiple operators. Slices can share common physical infrastructure or have dedicated resources and/or functions in some cases. Different types of network slices can be composed of not only standardized network functions but also some proprietary functions that are provided by different operators or third parties.

Standardized SST values and pre-defined slice types provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly-used pre-defined Slice/Service Types. Additional customization and/or specialization for applications and services are implementable for specific usage scenarios. A UE provides Network Slice Selection Assistance Information (NSSAI) parameters to the network to help it select a RAN and a core network part of a slice instance for the device. A single NSSAI can lead to the selection of several slices. NSSAI consists of Session Management NSSAIs (SM-NSSAI), which each include an SST and possibly a Slice Differentiator (SD). SST refers to an expected network behavior in terms of features, e.g., broadband or IoT, while the SD helps in the selection among several slice instances of the same type. Services supported in a standardized pre-defined slice are also supported by other pre-defined slices having other (i.e., non-standard) SST values in some cases.

Figure 19:
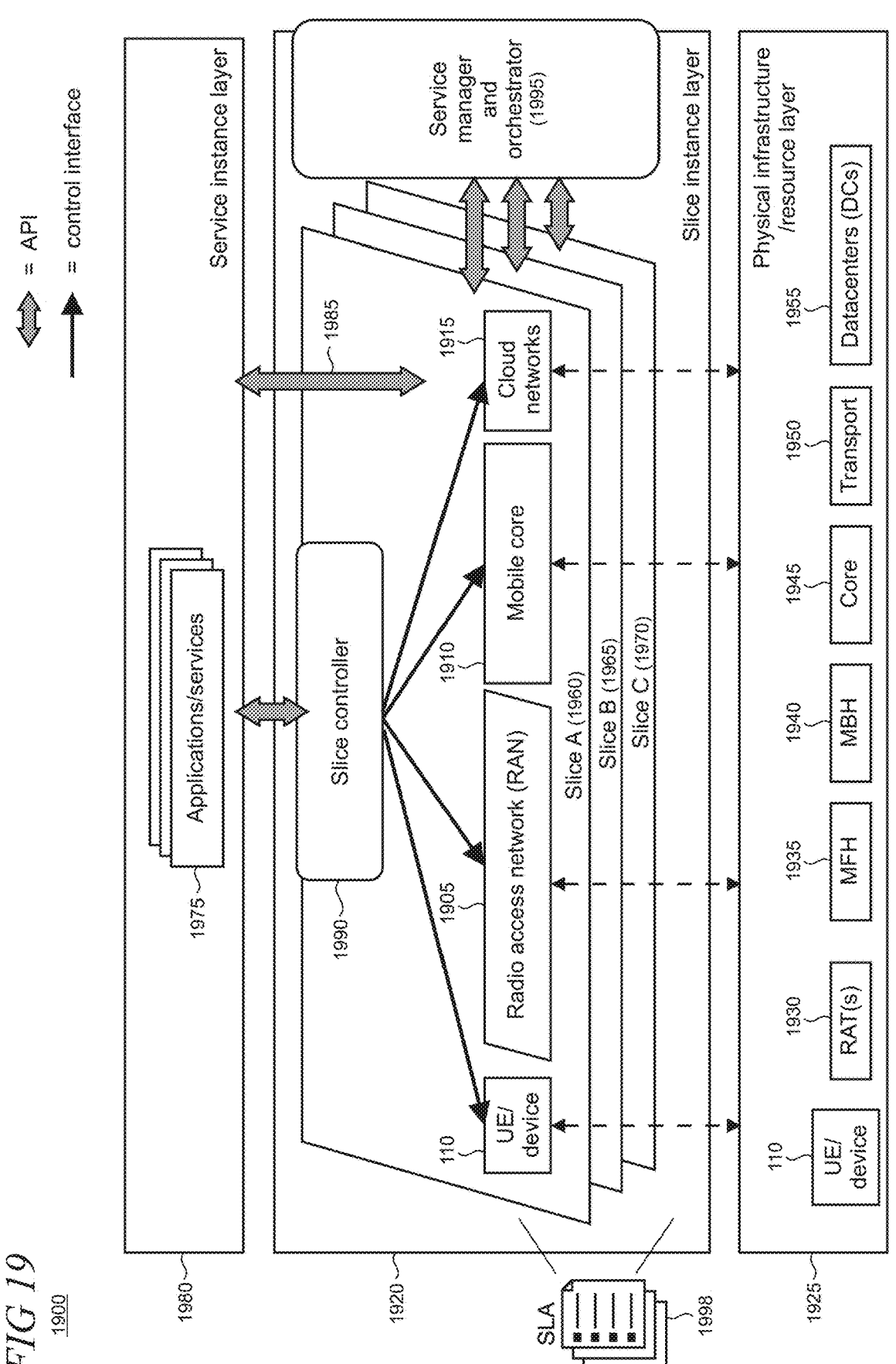
FIG. 19 shows an illustrative layered 5G (fifth-generation) network slicing framework.

FIG. 19 shows an illustrative layered 5G network slicing framework 1900 that is described in the IMT-2020 recommendation. The framework comprises a RAN 1905, mobile packet core 1910, and cloud networking components 1915 that are logically represented in a network slice instance layer 1920 that sits above a physical infrastructure layer 1925 in the framework. The physical infrastructure layer provides an abstraction of radio, compute, network, and storage resources which includes, for example, one or more RATs 1930, mobile fronthaul (MFH) 1935, mobile backhaul (MBH) 1940, mobile core network 1945, transport 1950, and one or more datacenters (DCs) 1955. In some cases, one or more UE instances are implemented as resources.

In this illustrative example, the slice instance layer includes three 5G network slices—Slice A 1960, Slice B 1965, and Slice C 1970, but more or fewer slices are capable of being utilized in any given implementation at any given time. These slices include one or more of pre-defined slice types or comprise different slice types.

Slices are isolated by logically or physically isolating their underlying resources. The slices can support instances of various applications and/or services (collectively indicated by reference numeral 1975) in a service instance layer 1980, for example, using an application programming interface (API), as representatively indicated by reference numeral 1985. Each network slice is an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 1990 is utilized within the slicing framework 1900 to maintain awareness of the application requirements to responsively allocate and manage the virtualized network functions and resources in each slice. A service manager and orchestrator 1995 combines the necessary resources and functions to produce a network slice instance. Its main tasks include creation of slice instances upon the underlying physical infrastructure, dynamically mapping network functions to slice instances to meet changing context and maintaining communication between the application and services and the framework to manage slice lifecycle.

As shown, a service level agreement (SLA) 1998 is applicable to each of the slices 1960, 1965, and 1970. Applicable SLAs typically vary in scope and composition. The slice controller 1990 advantageously performs resource allocation among RAN slices to meet the connectivity requirements while ensuring compliance with applicable SLA guarantees in some cases.

An SLA is defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported by the present enterprise mobile network delivery system, typically depending on applicable circumstances and context. For example, customers include, but are not limited to consumers, businesses, enterprises, organizations, service providers, application developers, and the like. A 5G network operator typically supports its own services to customers as well as services from multiple different third-party providers. For example, one third-party provider offers services to customers on one particular network slice while another third-party provider offers services on another network slice. Each discrete service offering generally has its own corresponding distinct SLA.

SLA terms typically include metrics covering technical aspects of service, for example describing a level and volume of communication services and which measure the performance characteristics of a provided service. Such technical metrics include but are not limited to, for example, availability, throughput, latency, bit/packet error rate, and energy. SLAs also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types are more inelastic. For example, the URLLC slice type generally requires strict resource allocation to guarantee reliability and low latency under a corresponding SLA, while enhanced MBB resources are readily scaled downward once the edge cloud buffering is complete.

Figure 20:
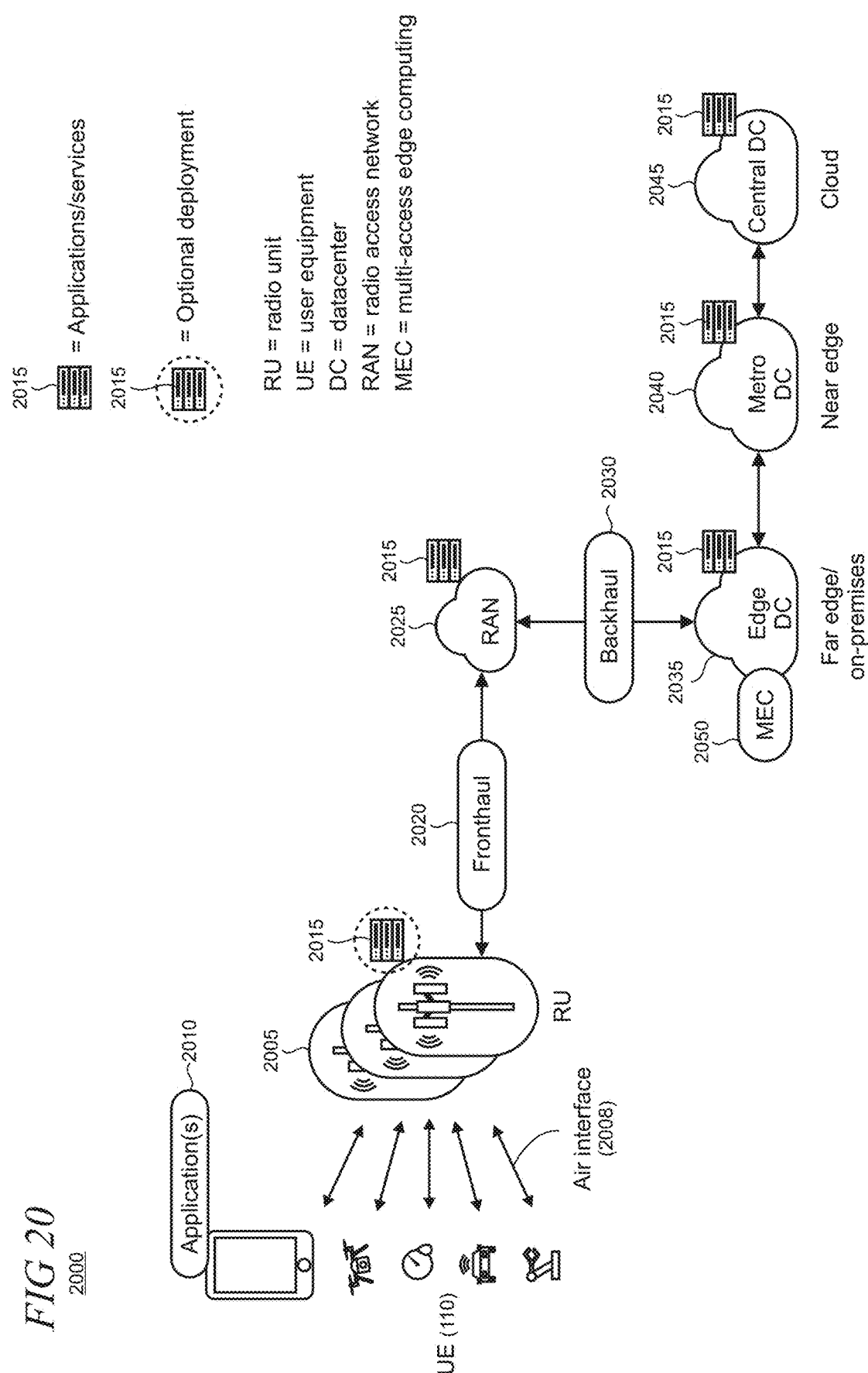
FIG. 20 shows illustrative physical infrastructure in a mobile network.

FIG. 20 shows illustrative physical infrastructure in a 5G network 2000. Multiple instances of a radio unit (RU) 2005 are configured to interact with a diverse population of UE 110 over an air interface 2008. Each UE typically includes one or more local applications 2010 or client-side software/firmware component that is arranged to interface with one or more remote application servers, service providers, or other resources (collectively indicated by reference numeral 2015) and thus requires network connectivity to such remote facilities.

The RUs are coupled by a mobile fronthaul 2020 to a RAN 2025. The RAN is coupled by a mobile backhaul 2030 to one or more datacenters (DCs). In this illustrative example, the DCs comprise an edge DC 2035, a metro DC 2040, and a central DC 2045. In some networking literature, the edge DC is referred to as a far edge or on-premises DC. The metro DC is often referred to as a near edge DC, and the central DC is often referred to as the cloud. In some implementations, the edge DC supports multi-access edge computing (MEC) functions 2050.

The application servers 2015 are locatable at various points in the network architecture 2000 to meet technical requirements and traffic demands. Typically, the application servers will be physically located closer to the UE 110 in cases where latency is sought to be minimized. However, an operator's application server location criteria generally consider factors such as management ease, scalability, and security, among other factors. In some implementations, an operator optionally deploys application servers and other resources in the RAN 2025 or RU 2005, as indicated by the dashed circles in FIG. 20.

Figure 21:
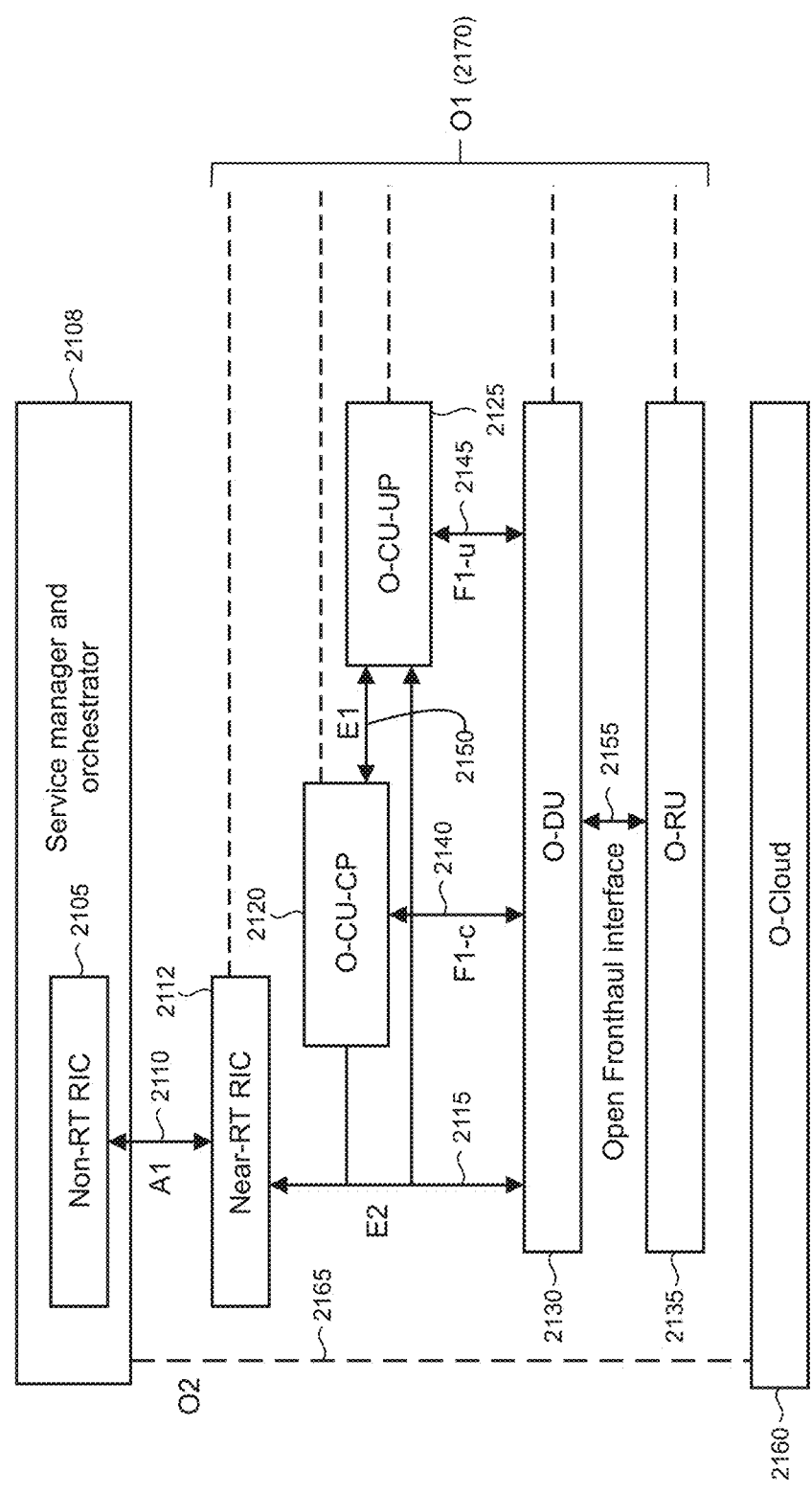
FIG. 21 shows an illustrative RAN operations and maintenance (OAM) logical architecture as described by the O-RAN Alliance.

FIG. 21 shows an illustrative RAN operations and maintenance (OAM) logical architecture as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT (real-time) MC (RAN intelligent controller) 2105 is incorporated into a service manager and orchestrator 2108. The non-RT MC interoperates with a near-RT RIC 2112 through an A1 interface 2110.

The near-RT RIC 2112 is coupled over an E2 interface 2115 with network functions for radio access for control and optimization including the O-CU-CP (O-RAN Central Unit-Control Plane) 2120, O-CU-UP (O-RAN Central Unit-User Plane) 2125, and O-DU 2130. The O-CU-CP and O-CU-UP are respectively coupled to the O-DU over F1-c and F1-u interfaces, 2140 and 2145, as defined and maintained by 3GPP. The O-CU-CP is coupled to the O-CU-UP over a 3GPP E1 interface 2150. The O-DU and O-RU 2135 are coupled using an Open Fronthaul interface 2155 (also known as the lower layer split (LLS) interface).

The O-Cloud 2160 is a cloud computing platform comprising a collection of physical infrastructure nodes that meet O-RAN requirements to host the relevant O-RAN functions (i.e., near-RT RIC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 2108 over the O2 interface 2165. An O1 interface 2170 is provided to each of the near-RT MC, O-CU-CP, O-CU-UP, O-DU, and O-RU, as shown in FIG. 21.

Figure 22:
FIG. 22 is a block diagram for an illustrative user equipment (UE) or illustrative white box radio unit (RU) usable at least in part to implement the present enterprise mobile network delivery system.

FIG. 22 is a block diagram of an illustrative UE 110 that is usable at least in part to implement the present enterprise mobile network delivery system. The embodiment of the UE 110 shown in FIG. 22 is for illustration only, and the UEs 110 shown in the drawings and described in the preceding text could have the same or similar configuration. However, it is noted that UEs typically come in a wide variety of configurations, and FIG. 22 does not limit the scope of the present disclosure to any particular implementation of a UE.

FIG. 22 is also usable to describe a basic architecture of a white box RU. The functional differences between the UE and white box RU are indicated using the dashed rectangles 2202 and 2204.

The UE 110 includes an antenna 2210, a radio frequency (RF) transceiver 2215, transmit (TX) processing circuitry 2220, a microphone 2225, and receive (RX) processing circuitry 2230. The UE 110 also includes a speaker 2235, a processor 2240, an input/output (I/O) interface 2245, an input device 2250, a display 2255, and a memory 2260. The memory includes an operating system (OS) program 2265 and one or more applications 2010.

The RF transceiver 2215 receives from the antenna 2210, an incoming RF signal transmitted by a gNB of a 5G network. The RF transceiver down-converts the incoming RF signal to generate an intermediate frequency (IF) or baseband signal. The IF or baseband signal is sent to the RX processing circuitry 2230, which generates a processed baseband signal by filtering, decoding, and/or digitizing the baseband or IF signal. The RX processing circuitry transmits the processed baseband signal to the speaker 2235 (such as for voice data) or to the processor 2240 for further processing (such as for web browsing data).

The TX processing circuitry 2220 receives analog or digital voice data from the microphone 2225 or other outgoing baseband data (such as web data, e-mail, or interactive video game data) from the processor 2240. The TX processing circuitry 2220 encodes, multiplexes, and/or digitizes the outgoing baseband data to generate a processed baseband or IF signal. The RF transceiver 2215 receives the outgoing processed baseband or IF signal from the TX processing circuitry and up-converts the baseband or IF signal to an RF signal that is transmitted via the antenna.

The processor 2240 can include one or more processors or other processing devices and execute the OS program 2265 stored in the memory 2260 to control the overall operation of the UE 110. For example, the processor controls the reception of forward channel signals and the transmission of reverse channel signals by the RF transceiver 2215, the RX processing circuitry 2230, and the TX processing circuitry 2220 in accordance with well-known principles. In some embodiments, the processor 2240 includes at least one microprocessor or microcontroller.

The processor 2240 is configured for executing other processes and programs resident in the memory 2260, such as operations for CSI measurement and reporting for systems described in embodiments of the present disclosure. The processor can move data into or out of the memory as required by an executing process. In some embodiments, the processor is configured to execute the applications 2010 based on the OS program 2265 or in response to signals received from gNBs or an operator. The processor is also coupled to the I/O interface 2245, which provides the UE 110 with the ability to connect to other computing devices such as laptop computers and handheld computers. The I/O interface thus functions as a communication path between such accessories and the processor.

The processor 2240 is also coupled to the input device 2250 (e.g., keypad, touchscreen, buttons etc.) and the display 2255. A user of the UE 110 can typically employ the input device to enter data into the UE. For example, the display can be a liquid crystal display or other display capable of rendering text and/or graphics, video, etc. from web sites, applications, and/or service providers.

The memory 2260 is coupled to the processor 2240. Part of the memory includes a random access memory (RAM), and another part of the memory includes a Flash memory or other read-only memory (ROM).

As described in more detail below, the UE 110 can perform signaling and calculation for channel state information (CSI) reporting. Although FIG. 22 shows one illustrative example of UE 110, various changes are capable of being made to the drawing. For example, various components are combinable, further subdividable, or omitted, and additional components could be added according to particular needs. As a particular example, the processor 2240 is divided into multiple processors, such as one or more CPUs and one or more graphics processing units (GPUs). Also, while FIG. 22 depicts the UE 110 as configured as a mobile device, such as a smartphone, UEs are configurable to operate as other types of portable or stationary devices.

Figure 23:
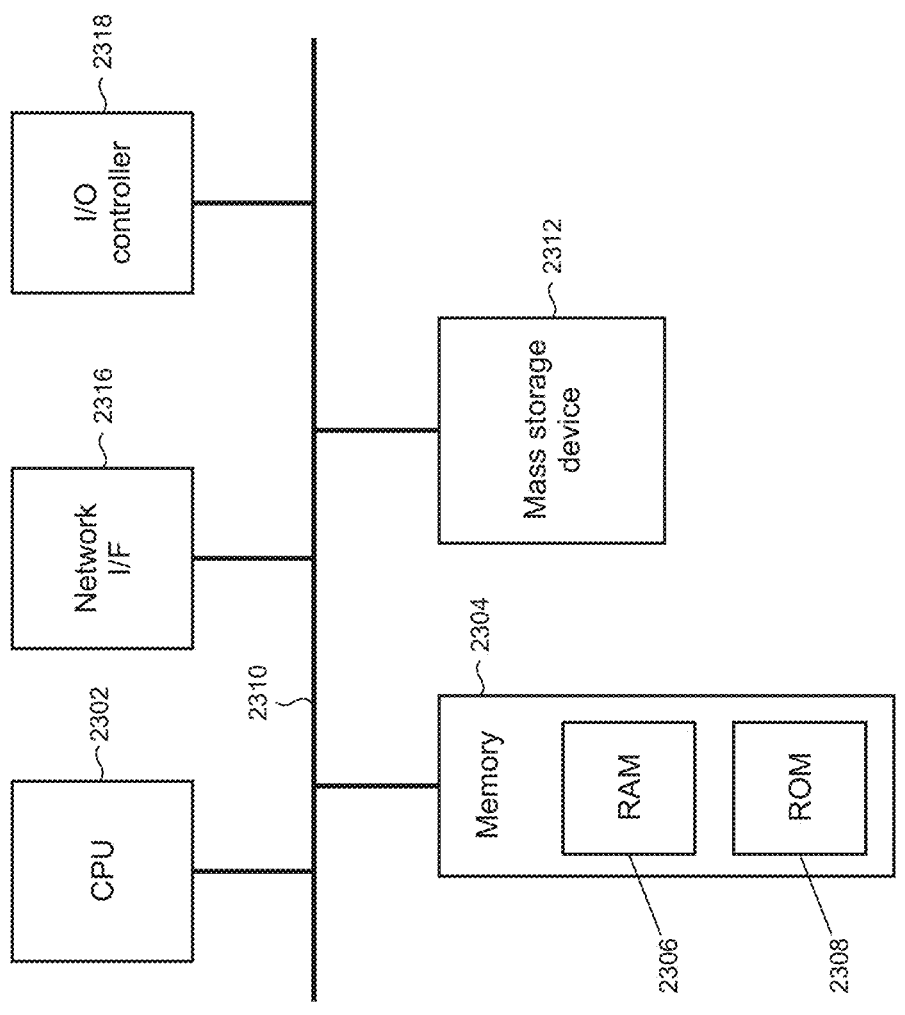
FIG. 23 is a block diagram of an illustrative server or computing device usable at least in part to implement the present enterprise mobile network delivery system.

FIG. 23 shows an illustrative architecture 2300 for a computing device, such as a server, capable of executing the various components described herein for the present enterprise mobile network delivery system. The architecture 2300 illustrated in FIG. 23 includes one or more processors 2302 (e.g., central processing unit, dedicated AI chip, graphics processing unit, etc.), a system memory 2304, including RAM (random access memory) 2306 and ROM (read only memory) 2308, and a system bus 2310 that operatively and functionally couples the components in the architecture 2300. A basic input/output system containing the basic routines that help to transfer information between elements within the architecture 2300, such as during startup, is typically stored in the ROM 2308. The architecture 2300 further includes a mass storage device 2312 for storing software code or other computer-executed code that is utilized to implement applications, the file system, and the operating system. The mass storage device 2312 is connected to the processor 2302 through a mass storage controller (not shown) connected to the bus 2310. The mass storage device 2312 and its associated computer-readable storage media provide non-volatile storage for the architecture 2300. Although the description of computer-readable storage media contained herein refers to a mass storage device, such as a hard disk or CD-ROM drive, computer-readable storage media can be any available storage media that can be accessed by the architecture 2300.

By way of example, and not limitation, computer-readable storage media includes volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 operates in a networked environment using logical connections to remote computers through a network. The architecture 2300 connects to the network through a network interface unit 2316 connected to the bus 2310. The network interface unit 2316 is also utilizable to connect to other types of networks and remote computer systems. The architecture 2300 includes an input/output controller 2318 for receiving and processing input from a number of other devices, including a keyboard, mouse, touchpad, touchscreen, control devices such as buttons and switches or electronic stylus (not shown in FIG. 23). Similarly, the input/output controller 2318 provides output to a display screen, user interface, a printer, or other type of output device (also not shown in FIG. 23).

The software components described herein, when loaded into the processor 2302 and executed, transform the processor 2302 and the overall architecture 2300 from a general-purpose computing system into a special-purpose computing system customized to facilitate the functionality presented herein. The processor 2302 is constructed from any number of transistors or other discrete circuit elements, which individually or collectively assume any number of states. More specifically, the processor 2302 is operable as a finite-state machine, in response to executable instructions contained within the software modules disclosed herein. These computer-executable instructions transform the processor 2302 by specifying how the processor 2302 transitions between states, thereby transforming the transistors or other discrete hardware elements constituting the processor 2302.

Encoding the software modules presented herein also transforms the physical structure of the computer-readable storage media presented herein. The specific transformation of physical structure is dependent on various factors, in different implementations of this description. Examples of such factors include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein is encoded on the computer-readable storage media by transforming the physical state of the semiconductor memory. For example, the software transforms the state of transistors, capacitors, or other discrete circuit elements constituting the semiconductor memory. The software also transforms the physical state of such components in order to store data thereupon.

As another example, the computer-readable storage media disclosed herein is implemented using magnetic or optical technology. In such implementations, the software presented herein transforms the physical state of magnetic or optical media, when the software is encoded therein. These transformations include altering the magnetic characteristics of particular locations within given magnetic media. These transformations also include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, many types of physical transformations take place in the architecture 2300 in order to store and execute the software components presented herein. The architecture 2300 includes other types of computing devices, including wearable devices, handheld computers, embedded computer systems, smartphones, PDAs, and other types of computing devices known to those skilled in the art. It is also contemplated that the architecture 2300 does not need to include all of the components shown in FIG. 23, is configurable to include other components that are not explicitly shown in FIG. 23, or is configurable to utilize an architecture completely different from that shown in FIG. 23.

Figure 24:
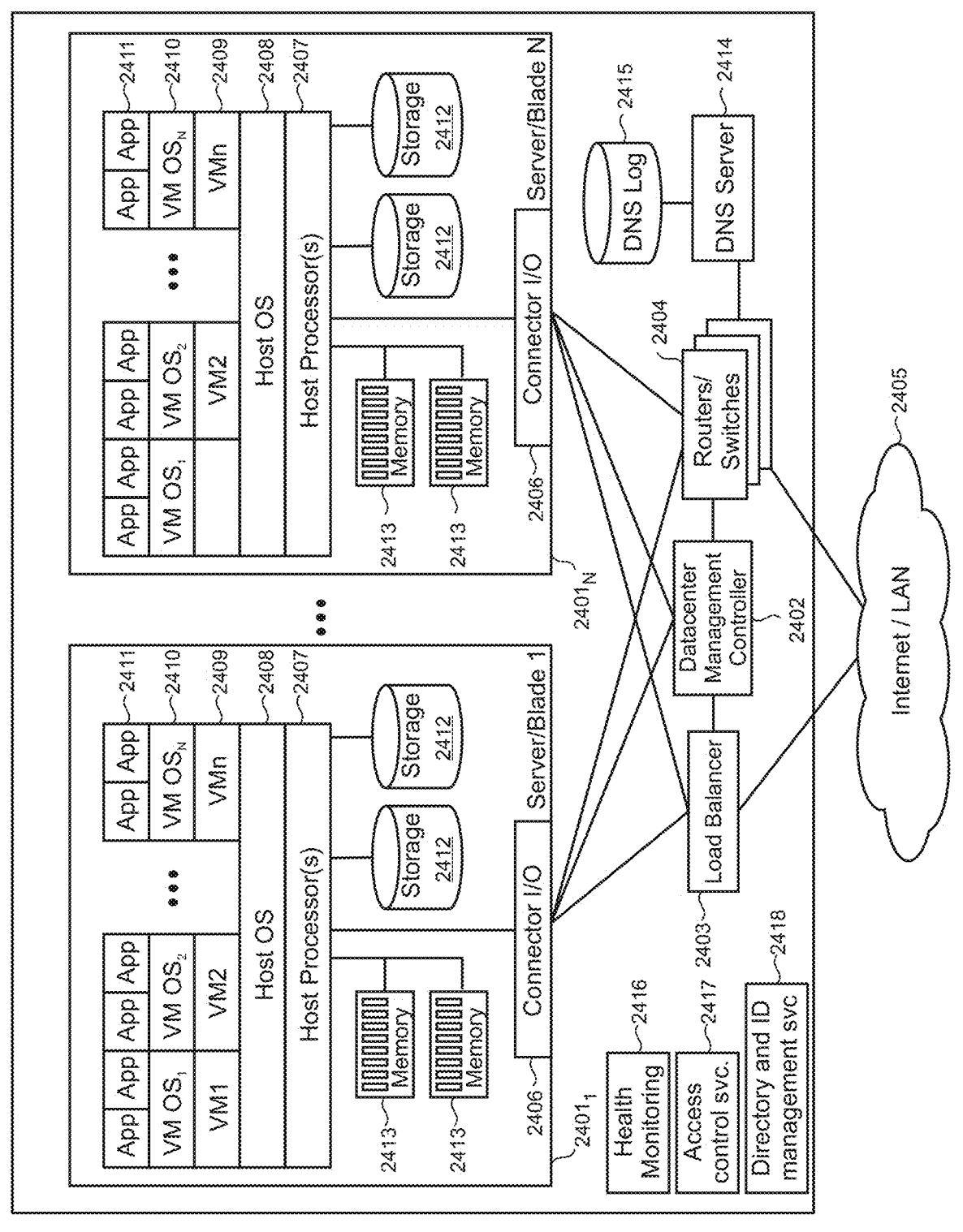
FIG. 24 is a block diagram of an illustrative datacenter usable at least in part to implement the present enterprise mobile network delivery system.

FIG. 24 is a high-level block diagram of an illustrative datacenter 2400 that provides cloud computing services or distributed computing services that are usable, at least in part, to implement the present enterprise mobile network delivery system. Datacenter 2400 typically incorporates one or more of the features disclosed in the DCs shown in the drawings and described in the accompanying text. A plurality of servers 2401 are managed by datacenter management controller 2402. Load balancer 2403 distributes requests and computing workloads over servers 2401 to avoid a situation wherein a single server becomes overwhelmed. Load balancer 2403 maximizes available capacity and performance of the resources in datacenter 2400. Routers/switches 2404 support data traffic between servers 2401 and between datacenter 2400 and external resources and users (not shown) via an external network 2405, which typically includes, for example, a local area network (LAN) or the Internet.

Servers 2401 are configurable as standalone computing devices, and/or they are configurable as individual blades in a rack of one or more server devices. Servers 2401 have an input/output (I/O) connector 2406 that manages communication with other database entities. One or more host processors 2407 on each server 2401 run a host operating system (OS) 2408 that supports multiple virtual machines (VM) 2409. Each VM 2409 typically runs its own OS so that each VM OS 2410 on a server is different, or the same, or a mix of both. The VM OSs 2410 are configurable using, for example, different versions of the same OS (e.g., different VMs running different current and legacy versions of the Windows® operating system). In addition, or alternatively, instances of the VM OS 2410 are provided by different manufacturers (e.g., some VMs running the Windows® operating system, while other VMs are running the Linux® operating system). Each VM 2409 typically also runs one or more applications (app) 2411. Each server 2401 also includes storage 2412 (e.g., hard disk drives (HDD)) and memory 2413 (e.g., RAM) that is accessed and used by the host processors 2407 and VMs 2409 for storing software code, data, etc. In one embodiment, a VM 2409 employs the data plane APIs as disclosed herein.

Datacenter 2400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2400 allows tenants to scale up or scale down resources dynamically to meet the current needs of their business. Additionally, a datacenter operator can provide usage-based services to tenants so that they pay for only the resources they use when they need to use them. For example, a tenant initially uses one VM 2409 on server 24011 to run their applications 2411. When demand for an application 2411 increases, the datacenter 2400 activates additional VMs 2409 on the same server 24011 and/or on a new server 2401N as needed. These additional VMs 2409 can be deactivated if demand for the application later drops.

Datacenter 2400 typically offers guaranteed availability, disaster recovery, and back-up services. For example, the datacenter designates one VM 2409 on server 24011 as the primary location for the tenant's application and activates a second VM 2409 on the same or a different server as a standby or back-up in case the first VM or server 24011 fails. The datacenter management controller 2402 automatically shifts incoming user requests from the primary VM to the back-up VM without requiring tenant intervention. Although datacenter 2400 is illustrated as a single location, it will be understood that servers 2401 are distributable to multiple locations across the globe to provide additional redundancy and disaster recovery capabilities. Additionally, datacenter 2400 is configurable as an on-premises, private system that provides services to a single enterprise user or configurable to be a publicly accessible, distributed system that provides services to multiple, unrelated customers and tenants or configurable as a combination of both.

Domain Name System (DNS) server 2414 resolves domain and host names into IP addresses for all roles, applications, and services in datacenter 2400. DNS log 2415 maintains a record of which domain names have been resolved by role. It will be understood that DNS is used herein as an example and that other name resolution services and domain name logging services are usable to identify dependencies, for example, in other embodiments, IP or packet sniffing, code instrumentation, or code tracing.

Datacenter health monitoring 2416 monitors the health of the physical systems, software, and environment in datacenter 2400. Health monitoring 2416 provides feedback to datacenter managers when problems are detected with servers, blades, processors, or applications in datacenter 2400 or when network bandwidth or communications issues arise.

Access control service 2417 determines whether users are allowed to access particular connections and services provided at the datacenter 2400. Directory and identity management service 2418 authenticates user credentials for tenants on datacenter 2400.

Figure 25:
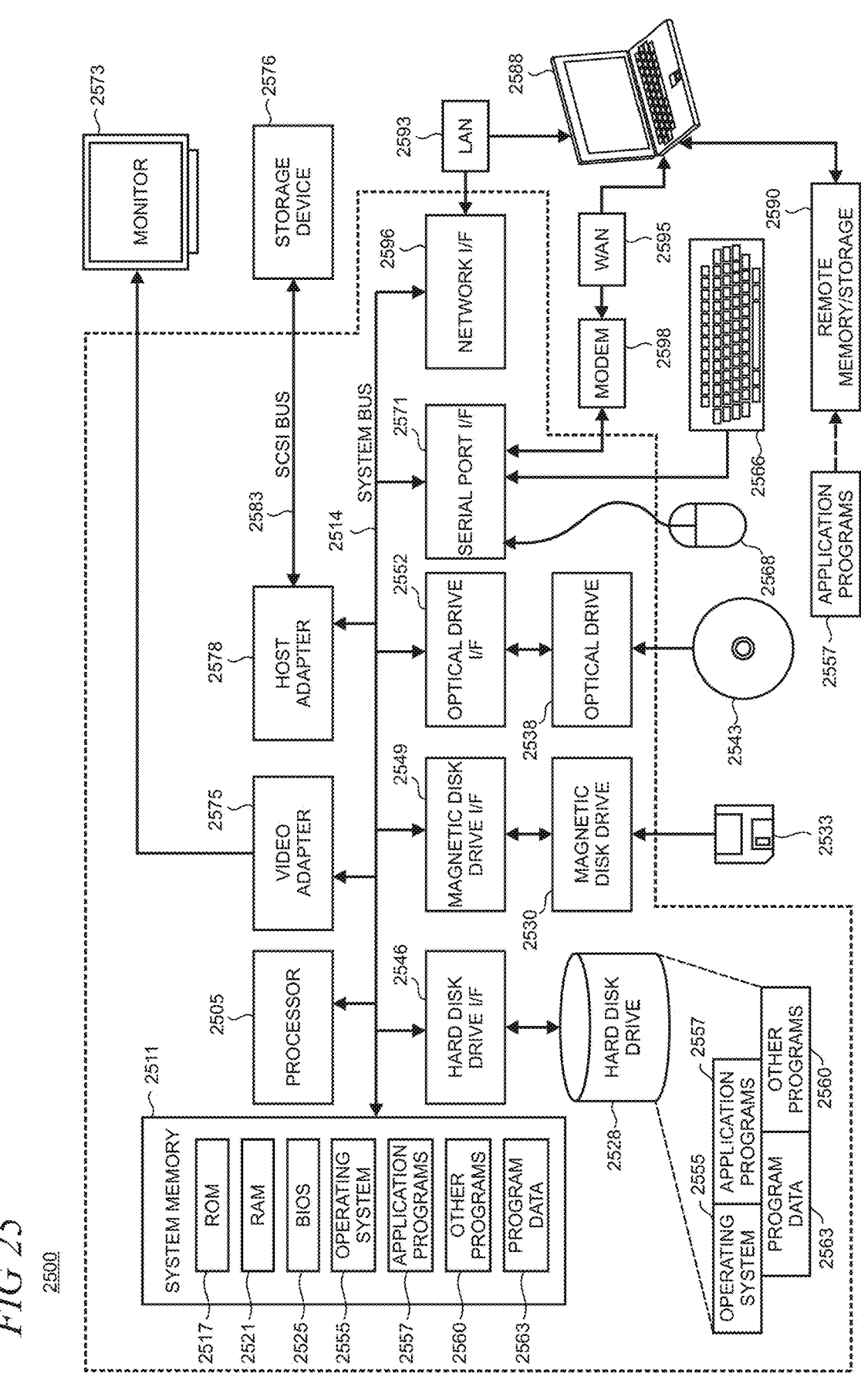
FIG. 25 is a simplified block diagram of an illustrative computer system usable at least in part to implement the present enterprise mobile network delivery system.

FIG. 25 is a simplified block diagram of an illustrative computer system 2500 such as a PC, client machine, or server usable, at least in part, to implement the present enterprise mobile network delivery system. Computer system 2500 includes a processor 2505, a system memory 2511, and a system bus 2514 that couples various system components including the system memory 2511 to the processor 2505. The system bus 2514 is any of several types of bus structures including a memory bus or memory controller, a peripheral bus, or a local bus using any of a variety of bus architectures. The system memory 2511 includes read only memory (ROM) 2517 and random access memory (RAM) 2521. A basic input/output system (BIOS) 2525, containing the basic routines that help to transfer information between elements within the computer system 2500, such as during startup, is stored in ROM 2517. The computer system 2500 further includes a hard disk drive 2528 for reading from and writing to an internally disposed hard disk (not shown), a magnetic disk drive 2530 for reading from or writing to a removable magnetic disk 2533 (e.g., a floppy disk), and an optical disk drive 2538 for reading from or writing to a removable optical disk 2543 such as a CD (compact disc), DVD (digital versatile disc), or other optical media. The hard disk drive 2528, magnetic disk drive 2530, and optical disk drive 2538 are connected to the system bus 2514 by a hard disk drive interface 2546, a magnetic disk drive interface 2549, and an optical drive interface 2552, respectively. The drives and their associated computer-readable storage media provide non-volatile storage of computer-readable instructions, data structures, program modules, and other data for the computer system 2500. Although this illustrative example includes a hard disk, a removable magnetic disk 2533, and a removable optical disk 2543, other types of computer-readable storage media which can store data that is accessible by a computer such as magnetic cassettes, Flash memory cards, digital video disks, data cartridges, random access memories (RAMs), read only memories (ROMs), and the like are also usable in some applications of the present enterprise mobile network delivery system. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules are storable on the hard disk, magnetic disk 2533, optical disk 2543, ROM 2517, or RAM 2521, including an operating system 2555, one or more application programs 2557, other program modules 2560, and program data 2563. A user enters commands and information into the computer system 2500 through input devices such as a keyboard 2566 and pointing device 2568 such as a mouse. Other input devices (not shown) include a microphone, joystick, game pad, satellite dish, scanner, trackball, touchpad, touchscreen, touch-sensitive device, voice-command module or device, user motion or user gesture capture device, or the like. These and other input devices are often connected to the processor 2505 through a serial port interface 2571 that is coupled to the system bus 2514, but are connectable by other interfaces, such as a parallel port, game port, or universal serial bus (USB). A monitor 2573 or other type of display device is also connected to the system bus 2514 via an interface, such as a video adapter 2575. In addition to the monitor 2573, personal computers typically include other peripheral output devices (not shown), such as speakers and printers. The illustrative example shown in FIG. 25 also includes a host adapter 2578, a Small Computer System Interface (SCSI) bus 2583, and an external storage device 2576 connected to the SCSI bus 2583.

The computer system 2500 is operable in a networked environment using logical connections to one or more remote computers, such as a remote computer 2588. The remote computer 2588 is selectable as another personal computer, a server, a router, a network PC, a peer device, or other common network node, and typically includes many or all of the elements described above relative to the computer system 2500, although only a single representative remote memory/storage device 2590 is shown in FIG. 25. The logical connections depicted in FIG. 25 include a local area network (LAN) 2593 and a wide area network (WAN) 2595. Such networking environments are often deployed, for example, in offices, enterprise-wide computer networks, intranets, and the Internet.

When used in a LAN networking environment, the computer system 2500 is connected to the local area network 2593 through a network interface or adapter 2596. When used in a WAN networking environment, the computer system 2500 typically includes a broadband modem 2598, network gateway, or other means for establishing communications over the wide area network 2595, such as the Internet. The broadband modem 2598, which is either internal or external, is connected to the system bus 2514 via a serial port interface 2571. In a networked environment, program modules related to the computer system 2500, or portions thereof, are storable in the remote memory storage device 2590. It is noted that the network connections shown in FIG. 25 are illustrative and other means of establishing a communications link between the computers are usable depending on the specific requirements of an application of the present enterprise mobile network delivery system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
   operating a core network in a software-defined mobile network supporting wireless communications for user equipment;
   providing a radio registration entity in operative communications with the core network, the radio registration entity interoperating with a radio unit supporting the wireless communications with the user equipment;
   receiving a discovery broadcast from the radio unit at the radio registration entity requesting a connection to the core network;
   operating the radio registration entity to determine eligibility of the radio unit to establish the connection to the core network; and
   in response to the determination, sending a core network configuration file to the radio unit from the radio registration entity, the core network configuration file identifying instances of network functions in the core network with which the radio unit implements the connection to the core network, the implemented connection enabling the wireless communications from the user equipment to be transported by the mobile network through the radio unit.

2. The computer-implemented method of claim 1 in which the wireless communications are supported using cellular frequencies comprising Citizens Broadband Radio Service (CBRS).

3. The computer-implemented method of claim 1 in which the software-defined mobile network comprises a 5G (fifth-generation) mobile network.

4. The computer-implemented method of claim 1 in which the radio unit is compliant with Open-RAN (radio access network) Alliance specifications.

5. The computer-implemented method of claim 1 further including querying, by the radio registration entity, an active directory associated with the core network radio to verify eligibility of the radio unit to establish the connection to the core network.

6. The computer-implemented method of claim 1 in which the core network configuration file includes certificates for authenticating the radio unit with the core network.

7. The computer-implemented method of claim 1 further including receiving the core network configuration file at the radio registration entity from a configuration server associated with the core network in response to a request made by the radio registration entity.

8. The computer-implemented method of claim 1 in which the radio unit includes an integrated distributed unit (DU) compliant with 3GPP (3rd Generation Partnership Project) specifications.

9. The computer-implemented method of claim 8 in which the radio unit includes an integrated centralized unit (CU) compliant with 3GPP (3rd Generation Partnership Project) specifications.

\* \* \* \* \*